(12) United States Patent  
Golubev

(10) Patent No.: US 11,602,713 B2  
(45) Date of Patent: Mar. 14, 2023

(54) METHOD FOR CRYOGENIC SEPARATION OF AIR, AND AIR SEPARATION PLANT

(71) Applicant: Linde Aktiengesellschaft, Munich (DE)

(72) Inventor: Dimitri Golubev, Geretsried (DE)

(73) Assignee: Linde Aktiengesellschaft, Munich (DE)

( * ) Notice: Subject to any disclaimer, the term of this patent is extended or adjusted under 35 U.S.C. 154(b) by 810 days.

(21) Appl. No.: 16/387,725

(22) Filed: Apr. 18, 2019

(65) Prior Publication Data

US 2019/0321772 A1    Oct. 24, 2019

(30) Foreign Application Priority Data

Apr. 19, 2018    (EP) ..................................... 18020162

(51) Int. Cl.
*F25J 3/02* (2006.01)
*B01D 53/04* (2006.01)
(Continued)

(52) U.S. Cl.
CPC ..... *B01D 53/0462* (2013.01); *B01D 53/0407* (2013.01); *B01D 53/047* (2013.01);
(Continued)

(58) Field of Classification Search
CPC ...... F25J 3/04412; F25J 3/0409; F25J 3/0429; F25J 3/04296
See application file for complete search history.

(56) References Cited

U.S. PATENT DOCUMENTS 4,022,030 A    5/1977   Brugerolle
5,704,228 A    1/1998   Tranier
(Continued)

FOREIGN PATENT DOCUMENTS

CN    106123489 A    11/2016
EP    0982554 A1    3/2000
(Continued)

OTHER PUBLICATIONS

European Search Report dated Oct. 9, 2018 issued in corresponding EP 18020162.6 application (8 pages).
(Continued)

*Primary Examiner* — Brian M King
(74) *Attorney, Agent, or Firm* — Millen White Zelano & Branigan, PC; Brion P. Heaney

(57) ABSTRACT

A method for cryogenic separation of air uses an air separation plant, wherein, in a mass transfer column, a liquid first fluid and a gaseous second fluid are subjected to mass transfer with one another. A gaseous third fluid is removed from the column and is at least partly discharged from the air separation plant. A liquid fourth fluid is removed from the column and is at least partly fed into a low-pressure column. The first fluid is formed using at least a part of an oxygen-rich liquid removed from the low-pressure column. The second fluid is formed using an oxygen-enriched liquid removed from a high-pressure column. The oxygen-enriched liquid removed from the high-pressure column and bottom liquid of the mass transfer column are mixed and partly evaporated in a condenser-evaporator. A liquid fifth fluid is removed from the mass transfer column between a feed point for the first fluid and a feed point for the oxygen-enriched liquid, and is at least partly fed into the low-pressure column. The fifth fluid or a fraction thereof is fed into the low-pressure column below the fourth fluid or a fraction thereof.

17 Claims, 11 Drawing Sheets

(51) Int. Cl.
  *B01D 53/047* (2006.01)
  *F25J 3/04* (2006.01)

(52) U.S. Cl.
  CPC ......... *F25J 3/0409* (2013.01); *F25J 3/04175* (2013.01); *F25J 3/04412* (2013.01); *B01D 2257/504* (2013.01); *B01D 2257/80* (2013.01); *B01D 2259/416* (2013.01)

(56) References Cited

U.S. PATENT DOCUMENTS

| | | | | |
|---|---|---|---|---|
| 5,881,570 | A | * | 3/1999 | Drnevich ............ F25J 3/04824 62/646 |
| 6,247,333 | B1 | | 6/2001 | Rieth et al. |
| 2001/0003909 | A1 | | 6/2001 | Brugerolle |
| 2010/0242538 | A1 | * | 9/2010 | Prosser ................ F25J 3/04678 62/646 |
| 2014/0174123 | A1 | * | 6/2014 | Rauch .................. F25J 3/04412 62/643 |
| 2016/0053764 | A1 | * | 2/2016 | Abdelwahab ........ F25J 3/04678 417/53 |
| 2016/0370111 | A1 | * | 12/2016 | Alekseev ............... F25J 3/0406 |

FOREIGN PATENT DOCUMENTS

| JP | 2000-258054 | A | | 9/2000 | |
|---|---|---|---|---|---|
| JP | 2000258054 | A | * | 9/2000 | ........... F25J 3/04303 |

OTHER PUBLICATIONS

English Abstract of JP 2000-258054 A published Sep. 22, 2000.
English Abstract of CN 106123489 A published Nov. 16, 2016.
Ondrey: "Reboiler Circuits For Trayed Columns. These vetted recommendations are key to efficient and troublefree separations", Chemical Engineering, vol. 118, Issue 1, 2011, XP007917654, (pp. 1-25).
Sloley: "Properly design thermosyphon reboilers", Chemical Engineering Progress, Mar. 1997, pp. 52-64; XP001525732.

* cited by examiner

METHOD FOR CRYOGENIC SEPARATION OF AIR, AND AIR SEPARATION PLANT

The invention relates to a method and to a plant for the cryogenic separation of air according to the respective preambles of the independent claims.

PRIOR ART

The production of air products in a liquid or gaseous state by cryogenic separation of air in air separation plants is known and described for example in H.-W. Haring (Ed.), Industrial Gases Processing, Wiley-VCH, 2006, in particular section 2.2.5, "Cryogenic Rectification".

Pure oxygen is required, at least not exclusively, for a number of industrial applications. This creates the possibility of optimizing air separation plants with regard to the installation and operating costs thereof, in particular to the energy consumption thereof. For details, reference is made to technical literature, for example F. G. Kerry, Industrial Gas Handbook: Gas Separation and Purification, CRC Press, 2006, section 3.8, "Development of Low Oxygen-Purity Processes". For example, for obtaining gaseous pressurized oxygen of relatively low purity, use may be made of air separation plants having so-called mixing columns. In this respect, reference is made for example to EP 3 179 186 A1 and the citations therein.

In a method proposed in U.S. Pat. No. 5,704,228 A for liquid evaporation by heat exchange with a condensing gas, the pressure of the liquid to be evaporated is reduced and said liquid is enriched with a less volatile constituent. According to an alternative approach, it is possible for the gas to be enriched with the less volatile constituent. Use may be made of a mixing column. Mixing column methods are also disclosed in JP 2000-258054 A, US 2001/0003909 A1, CN 106123489 A and EP 0 982 554 A1.

Conventionally, into a mixing column are fed, close to the top, an oxygen-rich liquid, and close to the bottom, gaseous pressurized air, so-called mixing column air, said liquid and air being subjected to mass transfer. In this way, it is possible for so-called "impure" oxygen to be drawn off at the top of the mixing column and to be removed from the air separation plant as gas product. A liquid which is separated at the bottom of the mixing column can be fed at a location which is suitable in terms of energy and/or separation technology into the distillation column system used. As a result of using a mixing column, it is in particular possible to reduce the energy required for increasing the pressure of an oxygen product, at the expense of the purity of the oxygen product.

In air separation plants having mixing columns, in particular, the maximum usable so-called injection equivalent is considerably limited for the reasons elucidated in more detail below. Consequently, however, it is also the case that the energy savings possible with an increase in the injection equivalent in an air separation plant are limited.

It is therefore the object of the present invention to remove this bottleneck, thereby to increase the efficiency of the air separation in corresponding plants, and, as far as possible, to reduce the costs incurred too.

DISCLOSURE OF THE INVENTION

Said object is achieved by a method and a plant for cryogenic separation of air having the respective features of the independent patent claims. Advantageous configurations form the subject matter of the respective dependent patent claims and of the description which follows.

First, there follows a more detailed elucidation of some terms used in the description of the present invention and of the advantages thereof and also the technical background serving as the basis.

In air separation processes, for cold generation and liquefaction of substance streams at different locations, use may be made of turboexpanders, also referred to as "turbines" for short, as fundamentally known to a person skilled in the art. Below, reference is made to "Claude turbines", "Lachmann turbines" and "pressurized nitrogen turbines". With regard to the function and purpose of such turboexpanders, reference is made to technical literature, for example F. G. Kerry, Industrial Gas Handbook: Gas Separation and Purification, CRC Press, 2006, in particular sections 2.4, "Contemporary Liquefaction Cycles", 2.6, "Theoretical Analysis of the Claude Cycle" and 3.8.1, "The Lachmann Principle".

In the case of a two-column system, by means of a Claude turbine, cooled pressurized air is expanded from a relatively high pressure level to the pressure level of the high-pressure column and is fed into the latter. By contrast, by means of a Lachmann turbine, cooled pressurized air is expanded to the pressure level of the low-pressure column and is fed into the latter. Finally, by means of a pressurized nitrogen turbine, nitrogen from the high-pressure column is expanded.

A typical Lachmann turbine ("injection turbine") expands pressurized air, which has cooled (and in this example not been compressed further), from a pressure level of, for example, approximately 5.0 to 7.0 bar (abs.), the typical pressure level at which a high-pressure column is operated, or from another pressure level, to a pressure level of, for example, approximately 1.2 to 1.6 bar (abs.), the typical pressure level at which a low-pressure column is operated. The air expanded in the Lachmann turbine is fed ("injected") into the low-pressure column. The expansion of a corresponding fraction of feed air is possible due to the stated pressure difference between the high-pressure column and the low-pressure column.

However, the air expanded in this way into the low-pressure column disturbs the rectification, and for this reason the quantity of the air able to be expanded in the injection turbine and thus the cold able to be generated in this way for a corresponding plant are fundamentally limited, that is to say limited even without the use of a mixing column. Nitrogen-rich air products which are removed from the high-pressure column and discharged from the air separation plant also influence the rectification in a corresponding manner. The quantity of the air fed into the low-pressure column plus the nitrogen removed from the high-pressure column and discharged from the air separation plant can be specified in relation to the total air supplied to the distillation column system. The value obtained here is normally referred to as "injection equivalent".

Thus, the injection equivalent is defined as the quantity of the compressed pressurized air which is expanded into the low-pressure column of an air separation plant by means of an injection turbine plus the quantity of the nitrogen which is optionally removed from the high-pressure column and neither is recycled as liquid reflux into the high-pressure column itself nor is introduced as liquid reflux to the low-pressure column, in relation to the total pressurized air fed into the distillation column system. Here, the nitrogen which is removed from the high-pressure column can be pure or substantially pure nitrogen from the top of the high-pressure column, but can also be a nitrogen-enriched gas which can, with a lower nitrogen content, be drawn off from the high-pressure column from a region below the top.

If in a corresponding air separation plant an injection turbine is used and, in the latter, a quantity M1 of pressurized air is expanded, a quantity M2 of nitrogen is removed from the high-pressure column and is removed from the air separation plant as liquid and/or gaseous nitrogen product, that is to say is not used as reflux to the high- and/or the low-pressure column, and a quantity M3 of pressurized air is supplied overall to the distillation column system, the injection equivalent E in a corresponding plant is calculated as $$E=(M1+M2)/M3 \tag{1}$$

Fundamentally, the increase in the injection equivalent in an air separation plant permits a reduction in the energy requirement.

The expansion of nitrogen or a nitrogen-rich fluid from the high-pressure column in a pressurized nitrogen turbine may be realized before said nitrogen is completely heated in the main heat exchanger (so-called cold pressurized nitrogen turbine) or subsequently thereto (so-called warm pressurized nitrogen turbine). Afterwards, the expanded nitrogen may be used in particular for the regeneration of adsorbers. The use of a pressurized nitrogen turbine also allows the energy consumption of an air separation plant to be lowered. However, the pure or impure nitrogen from the high-pressure column expanded in a pressurized nitrogen turbine also contributes to the injection equivalent, since said nitrogen is not used as reflux to the high- and/or the low-pressure column.

If a pressurized nitrogen turbine is supplied with nitrogen from the top of the high-pressure column, said nitrogen is correspondingly pure. However, a pressurized nitrogen turbine can also be supplied with impure nitrogen from the high-pressure column. In the latter case, a corresponding pressurized nitrogen turbine is also referred to as "impure pressurized nitrogen turbine". An impure pressurized nitrogen turbine is distinguished by the fact that a nitrogen-rich fluid is supplied thereto from the high-pressure column, the nitrogen content of which fluid is below the nitrogen of the top product of the high-pressure column, that is to say below the maximum nitrogen content in the high-pressure column.

The reason for the lower injection equivalent available in conventional mixing column methods in relation to other methods for cryogenic separation of air is in particular the fact that the air stream fed into the mixing column is not optimally involved in the rectification process in the double column. In this regard in particular, the oxygen available in this air stream completely passes the high- and low-pressure column. Said oxygen is discharged in the form of the top product of the mixing column from the air separation plant. By contrast, the nitrogen contained in the air stream to the mixing column remains (following the transfer process in the mixing column) almost completely in the bottom liquid of the mixing column. Said bottom liquid typically has an oxygen content of approximately 65% and, in the known methods, is fed into low-pressure column at a feed point corresponding to this oxygen content.

However, from a separation technology standpoint, said feed point is located in a region of the low-pressure column which is situated relatively far down, that is to say at a point where the oxygen content is still relatively high. The rectification or separation section situated below the feed point can already be regarded as an oxygen section since, below the feed point for the bottom product of the mixing column, no further feeding into the low-pressure column is realized. Consequently, it is necessary for the nitrogen to be separated from the air stream to the mixing column (which passes into the low-pressure column in the form of the bottom liquid of the mixing column) from very far down from a separation technology standpoint. However, under given conditions, said separation is extremely complex and requires relatively high power at the main condenser. Consequently, it is necessary for the injection quantity into the low-pressure column, or the injection equivalent mentioned, to be correspondingly reduced, in order to be able to accomplish satisfactory separation.

The apparatuses used in an air separation plant are described in the cited technical literature, for example in Haring in section 2.2.5.6, "Apparatus". Where the following definitions do not deviate from this, reference is therefore explicitly made to the cited technical literature with regard to the linguistic usage in the context of the present application.

Rectification or separation columns which are used in the cryogenic separation of air have so-called separation sections. A separation section is a region of a rectification column, which region is equipped with separation internals or separation structures such as sieve trays or structured or unstructured packings. A separation section is distinguished in particular by the fact that it is situated between two feed points for fluids into a corresponding rectification column or is situated between a feed point and a removal point for fluid, and that between said two feed points, or the feed point and removal point, no further feed points or removal points for fluid into or from the rectification column are present. The respective feed points are feed lines for fluids into the rectification column, said lines being used for feeding in a regular manner during the operation of a corresponding air separation plant. The same correspondingly applies to removal points. However, this does not exclude a corresponding rectification column also having further openings between the feed points. Said further openings are however not used during normal operation of the air separation plant. The terms "distillation" and "rectification" are used here synonymously.

In the context of the present linguistic usage, liquids and gases can be rich or poor in one or more components, wherein "rich" may represent a content of not less than 50%, 75%, 90%, 95%, 99%, 99.5%, 99.9% or 99.99% and "poor" may represent a content of not more than 50%, 25%, 10%, 5%, 1%, 0.1% or 0.01% on a molar, weight or volume basis. The expression "predominantly" may correspond to the definition of "rich".

Liquids and gases may furthermore be enriched with or depleted of one or more components, wherein these expressions relate to a content in a starting liquid or a starting gas from which the liquid or the gas has been obtained. The liquid or the gas is "enriched" if said liquid or gas comprises a content of a corresponding component of at least 1.1 times, 1.5 times, 2 times, 5 times, 10 times, 100 times or 1000 times that of the starting liquid or the starting gas, and is "depleted" if said liquid or gas comprises a content of a corresponding component of at most 0.9 times, 0.5 times, 0.1 times, 0.01 times or 0.001 times that of the starting liquid or the starting gas. Here, where "oxygen" or "nitrogen" are referred to, for example, these are also to be understood to mean a liquid or a gas which is rich in oxygen or nitrogen but which need not necessarily be composed exclusively thereof.

For characterization of pressures and temperatures, the present application uses the terms "pressure level" and "temperature level", by means of which it is intended to express the fact that pressures and temperatures in a corresponding plant need not be used in the form of exact pressure and temperature values in order to realize the concept of the invention. However, such pressures and temperatures typically vary within particular ranges of, for example, ±1%, 5%, 10%, 20% or even 50% around an average value. It is possible here for corresponding pressure levels and temperature levels to lie in disjoint ranges or in overlapping ranges. In particular, pressure levels for example include unavoidable or expected pressure losses. The same correspondingly applies to temperature levels. The pressure levels stated here in bar are absolute pressures.

ADVANTAGES OF THE INVENTION

As elucidated, in known mixing column methods, the usable injection equivalent is significantly lower in comparison with other methods of cryogenic separation of air. Consequently, the field of use of corresponding methods is considerably limited or, in certain cases, additional measures are required, which lead to a noticeable increase in costs. In this regard, it is necessary to have a multi-layer compressor for gaseous nitrogen if, in addition to an oxygen product, a relatively large quantity of pressurized nitrogen is also delivered.

It is also the case that in the case of increased liquid production (which is significantly larger than a flushing quantity required for discharging undesirable components), mixing column methods are relatively disadvantageous since, in this case, either a relatively poor oxygen yield has to be accepted (which leads to high operating costs owing to high injection quantities) or other measures, such as for example an additional medium-pressure turbine in combination with a so-called high air pressure interconnection, are required. The reduction in the oxygen yield results from the fact that, in the case of increased liquid production, higher cold power is required, this however only being able to be satisfied by a higher turbine or injection quantity. However, in conventional mixing columns, this rapidly leads to the reduction in the oxygen yield, that is to say more air molecules (more feed air) are (is) required in the process in order to produce the same number of product oxygen molecules. The use of the further measures mentioned leads to increased installation costs for corresponding plants.

If one considers the heat exchanger in an optimized (but conventional) mixing column method, then, even in the case of pure gas production, it is necessary for said heat exchanger to be of relatively large dimensions since the turbine power (or the turbine injection quantity) also depends very highly on so-called transfer losses at the warm end of the heat exchanger. Therefore, in a mixing column method, the transfer losses should be kept relatively low by increasing the transfer surface area in the heat exchanger.

The present invention overcomes the disadvantages mentioned in that no feed air stream, but instead another substance stream, is fed into the mixing column or into a comparable apparatus used for mass transfer (such an apparatus will also be referred to below simply as "mixing column"). In this case, in the context of the present invention, an oxygen-enriched liquid from the high-pressure column, in particular the bottom liquid thereof, is involved. Said liquid, which is already enriched with oxygen in relation to atmospheric air, is in particular fed in liquid form into the mixing column or a corresponding apparatus and, in the process, is mixed with liquid flowing down in the mixing column or the corresponding apparatus, in particular in the bottom. By means of an evaporator, the mixed liquid is, as elucidated below, evaporated and the vapor formed rises in the mixing column or the corresponding apparatus. Thus, according to the invention, the gas phase in a corresponding mixing column or the corresponding apparatus is formed not by pressurized air, but rather in this alternative manner.

The evaporation process is in this case realized in particular by (partial) condensation of an air stream at a corresponding pressure. It is in particular possible for air liquefied in this manner to be subsequently subcooled and fed into the low-pressure column at a suitable feed point. However, said feed point is located relatively far up in the low-pressure column, that is to say at a position where the oxygen content is already relatively low. Liquid drawn off from the bottom of the high-pressure column is in this way, as it were (from a liquid balance standpoint), divided into two fractions, namely a first fraction, which is enriched somewhat with oxygen by way of partial evaporation in the condenser of the mixing column, and the liquid air. This division allows better optimization of liquid/vapor (L/V) ratios in the low-pressure column and, in this way, a better approximation of the equilibrium and operating lines in the McCabe-Thiele diagram. Consequently, in the context of the present invention, an additional separation section is advantageously provided in the low-pressure column. A part of the bottom liquid from the high-pressure column (if also mixed with the liquid flowing down in the mixing column) is evaporated by way of liquefaction of air and is conducted in gaseous form into the mixing column.

Here, the evaporated quantity corresponds roughly to the air liquefied in the process (which is subsequently conducted into the low-pressure column). Consequently, a corresponding analogy arises: The bottom liquid from the high-pressure column is practically divided between two liquid fractions of differing composition.

However, a significant advantage of the interconnection according to the invention is that the feed air is completely conducted into the distillation column system and, there, can be correspondingly used for providing air products. As mentioned, in conventional methods, the air stream fed into the mixing column is not optimally involved in the rectification process in the double column, and in particular, the oxygen present in this air stream completely passes the high- and low-pressure column. However, said air stream does this in the context of the present invention. In this way, the rectification ratios are considerably improved and the effort required for rectification is reduced. In this regard, no oxygen molecules pass the rectification columns as in conventional methods (all the oxygen is treated in terms of separation technology in said columns), and no excess nitrogen, which is to be separated with great effort, accumulates in the low-pressure column. In this way, the power of the main condenser can be considerably reduced, or, in a corresponding plant, a significant increase in the injection equivalent with associated energy savings is possible.

Through the use of the present invention, significantly greater efficiency is achieved in comparison with conventional mixing column methods. The use of the present invention also allows the volume of the main heat exchanger to be significantly reduced in some cases. This is possible in particular owing to the significantly greater injection which the present invention permits. In the context of the present invention, it is furthermore possible to make use of only a single generator turbine if air is fed into the low-pressure column in this way. There is no need for two units, which are required in conventional methods with mixing columns for corresponding half-load or liquid cases. Furthermore, the result is noticeably smaller dimensions with diverse components such as pressure column and main condenser.

For the purpose of achieving the advantages mentioned, the present invention proceeds from a method for cryogenic separation of air using an air separation plant having a distillation column system which has a high-pressure column operated at a first pressure level, has a low-pressure column operated at a second pressure level, below the first pressure level, and has a mass transfer column operated at a third pressure level. The mass transfer column may be operated in particular at a pressure level which lies between the pressure level of the high-pressure column and the pressure level of the low-pressure column. The mass transfer column may basically be designed in a manner comparable with a known mixing column. In particular, it has, for the fluids elucidated below, feed and removal points at in each case suitable heights, and has mass transfer structures which may be designed for example in the form of sieve trays or in the form of ordered or unordered packings. As elucidated below, in the context of the present invention, the mass transfer column is assigned a condenser-evaporator which is operated as elucidated below. Furthermore, in the context of the present invention, the mass transfer column is, as elucidated below, equipped with an additional intermediate removal point for liquid and may in particular have an associated further separation section. In the context of the present invention, a means of feeding the removed liquid into the low-pressure column is correspondingly provided.

In the mass transfer column, a liquid first fluid with a first oxygen content and a gaseous second fluid with a second oxygen content, below the first oxygen content, are subjected to mass transfer with one another, wherein a gaseous third fluid with a third oxygen content, reduced in relation to the first oxygen content, is removed from the mass transfer column and is at least partly discharged from the air separation plant, and wherein a liquid fourth fluid with a fourth oxygen content, corresponding at least to the second oxygen content, is removed from the mass transfer column and is at least partly fed into the low-pressure column. In this respect, the operation of the mixing column used in the context of the present invention therefore corresponds to conventional mixing columns, in which corresponding substance streams (in that case a liquid stream from the low-pressure column and a pressurized air stream) are subjected to mass transfer and top gas and bottom liquid are removed from the mixing column.

As is likewise in this respect still customary during the operation of mixing columns, in the context of the present invention too, the first fluid is formed here using an oxygen-rich liquid from the low-pressure column. In particular, said liquid is, without further change, introduced in liquid form to the mass transfer column in an upper region and trickles down in said column.

However, according to the invention, it is provided that the second fluid is formed using an oxygen-enriched liquid removed from the high-pressure column, in particular bottom liquid of the high-pressure column. In this case, "second fluid" refers here to the fluid rising in gaseous form in the mass transfer column. In the context of the present invention, this is formed through the additional use of a liquid formed in the mass transfer column, in particular the bottom liquid thereof. The oxygen-enriched liquid removed from the high-pressure column is evaporated for the purpose of forming the second fluid. Here, in the context of the present invention, said liquid is evaporated together with the liquid formed in the mass transfer column. The evaporation is realized using a condenser-evaporator, which is elucidated in more detail below, in particular in indirect heat exchange with compressed and cooled feed air.

In the context of the present invention, the first oxygen content may be 90 to approximately 99 mole percent, in particular 93 to 98.5 mole percent, of oxygen, the second oxygen content may be 30 to 45 mole percent, in particular 33 to 40 mole percent, of oxygen, the third oxygen content may be 80 to 98 mole percent, in particular 90 to 97.5 mole percent, of oxygen, and the fourth oxygen content may be 55 to 72 mole percent, in particular 59 to 67 mole percent, of oxygen. In the remaining fraction, said fluids predominantly comprise nitrogen and, to a lesser extent, noble gases.

These measures make it possible to achieve the advantages mentioned. The fact that, here, no pressurized air is fed into the mass transfer column but rather the vapor rising in the mass transfer column is formed in particular by evaporation of the oxygen-enriched liquid from the high-pressure column and of the liquid formed in the mass transfer column, in particular the bottom liquid thereof, means that, as mentioned, the feed air is completely conducted into the distillation column system and, there, is correspondingly separated. In this way, as already elucidated, the rectification ratios are considerably improved and the effort required for rectification is reduced, in particular because no oxygen molecules pass the rectification columns and no excess nitrogen, which is to be separated with great effort, accumulates in the low-pressure column. Reference is made to the further elucidations above. In particular, the use of the present invention results in the effort in terms of separation and the required condenser power being reduced. In this way, it is possible for a greater quantity of air to be injected into the low-pressure column, with the result that the total energy requirement is reduced.

As mentioned, in the context of the present invention, the second fluid is the gas rising in the mass transfer column. As likewise already discussed in detail above, in the context of the present invention, said second fluid is formed in that the oxygen-enriched liquid removed from the high-pressure column and bottom liquid of the mass transfer column are evaporated by means of a condenser-evaporator.

In the context of the present invention, the oxygen-enriched liquid from the high-pressure column, which is used during the formation of the second fluid, may have an oxygen content of 38 to 42 mole percent, for example approximately 40 mole percent. As mentioned, the use of a corresponding condenser-evaporator makes it possible for air to be condensed, or partly condensed, in parallel with corresponding evaporation, said air subsequently being able to be fed in particular into the low-pressure column.

It is fundamentally particularly advantageous if a previously compressed and cooled quantity of air is cooled further, and at least partly liquefied, in the condenser-evaporator, said quantity of air then being supplied to the distillation column system. Said quantity of air is referred to as "first" quantity of air here merely for reasons of simplified referencing or linguistic referencing. Here, the first quantity of air can be compressed to the first pressure level, that is to say to the pressure level of the high-pressure column, but also to a higher or lower pressure level, prior to the further cooling and at least partial liquefaction. As elucidated below, the pressure level used here is coordinated in particular with the desired pressure level of the gaseous third fluid, which is removed from the mass transfer column and which is provided as gaseous oxygen product. For the compression, use is made here in particular of a main air compressor of the air separation plant, or said main air compressor is involved together with other compressors or boosters in the compression. The cooling performed initially prior to the further cooling in the condenser-evaporator is realized in particular in the main heat exchanger. As elucidated, it is possible in this case for a corresponding first quantity of air to be completely liquefied and fed into the low-pressure column or partly fed into the high-pressure column and into the low-pressure column. However, in certain cases, it may also be advantageous if a corresponding first quantity of air is partly liquefied and is fed, in particular in the form of a two-phase stream, into the high-pressure column.

In other words, it may be provided that the compressed and cooled first quantity of air is dimensioned, and the compression and cooling thereof are performed, such that said quantity of air is at least partly liquefied in the condenser-evaporator owing to the further cooling which is realized there, wherein, following the liquefaction, the first quantity of air is at least partly fed into the low-pressure column or, for example, also into the high-pressure column and into the low-pressure column. As also elucidated below with reference to FIG. 3, it is also possible in this case for the first quantity of air at least partly liquefied in the condenser-evaporator to be fed only into the low-pressure column. Said quantity of air is in particular conducted through a subcooler beforehand. In particular, in this case, it may be provided that, in addition to the first quantity of air, further compressed and cooled, albeit non-liquefied, air, which, in particular, is not conducted through the condenser-evaporator, is fed into the high-pressure column. The first quantity of air and the further, non-liquefied air fed into the high-pressure column are formed in particular using a compressed air stream which is removed on the cold side from the main heat exchanger of a corresponding plant. Said air stream is compressed in particular to a pressure level at which the high-pressure column is operated.

In a further configuration of the present invention, it may be provided that the compressed and cooled first quantity of air, which, in this case, is liquefied only partially in the condenser-evaporator owing to the further cooling which is realized there, constitutes all of the air fed into the high-pressure column, that is to say no further air is fed into the high-pressure column apart from the first partial quantity. In particular, in this case, apart from the first quantity of air and the second quantity of air elucidated below, no further air is fed into the distillation column system.

In both cases, a medium is provided in the form of a corresponding quantity of air, by means of which medium the oxygen-enriched liquid from the high-pressure column can be evaporated together with the bottom liquid of the mass transfer column. The air used here can be completely fed into the distillation column system. By contrast with conventional mixing column methods, all the fed air is therefore involved in the rectification.

As mentioned, a pressure level at which feed air is conducted through the condenser-evaporator is coordinated in particular with the desired pressure level of the gaseous third fluid, which is removed from the mass transfer column and which is provided as gaseous oxygen product. In one configuration of the present invention, the compression of the first quantity of air is performed here to the first pressure level prior to the at least partial liquefaction in the condenser-evaporator. The gaseous third fluid is removed from the air separation plant or from a cold box of such an air separation plant in particular at a relatively low pressure level in this case. This last-mentioned pressure level may be for example approximately 3.2 bar or less. Here, an average temperature difference in a main condenser which connects the high-pressure column and the low-pressure column in a heat-exchanging manner may in in particular be approximately 1K. A higher oxygen product pressure may be used in principle, but would lead to the first pressure level having to be increased further for this purpose. However, this is generally associated with poorer overall efficiency. For corresponding compression, it is possible in particular for provision to be made for a main air compressor from which the first quantity of air is removed at the first pressure level. Provision may also be made for the first quantity of air to be removed from the main air compressor at a lower pressure level and for said quantity of air to subsequently be brought to the first pressure level by means of one or more boosters or post-compressors. However, the first quantity of air can, in a corresponding manner, also be compressed overall only to a pressure level which is below the first pressure level, in particular with subsequent feeding into the low-pressure column. In such a case, it is possible for the gaseous third fluid to be removed from the mass transfer column of the air separation plant or from a cold box of such an air separation plant in particular at a relatively low or even lower pressure level.

Alternatively, the compression of the first quantity of air prior to the at least partial liquefaction in the condenser-evaporator may also be performed to a pressure level above the first pressure level. In this case, the gaseous third fluid is removed from the air separation plant or from a cold box of a corresponding air separation plant in particular at a pressure level which is greater than 3.2 bar. This last-mentioned pressure level may be below or above the first pressure level. The first pressure level corresponds to the pressure level of the high-pressure column, which is operated in particular at approximately 5.0 to 7.0 bar. The pressure level to which the first quantity of air is in this case compressed may in particular be 1 to 7 bar above the first pressure level, for example 6 to 14 bar. Corresponding compression may likewise be performed in a main air compressor, for example if this provides a corresponding end pressure. In such a case, it is also possible for other air streams to be removed from the main air compressor at a lower pressure level. Provision may also be made for the first quantity of air to be removed from the main air compressor at a lower pressure level and for said quantity of air to subsequently be brought to the pressure level above the first pressure level by means of one or more boosters or post-compressors. Here, the gaseous third fluid can be removed from the mass transfer column or from the air separation plant or from the cold box thereof in particular at a pressure level which is 3.5 to 11 bar or 4 to 8 bar (minus the pressure losses in the heat exchanger and in the lines). Alternatively, compression of the first quantity of air prior to the at least partial liquefaction in the condenser-evaporator to a pressure level below the first pressure level is also possible.

In the method according to the invention, a previously likewise compressed and cooled quantity of air, which is referred to as "second" quantity of air here merely for reasons of simplified referencing or linguistic referencing, is advantageously expanded to the second pressure level and fed into the low-pressure column. In this case, said quantity of air is a quantity of air which is expanded in an expansion turbine (Lachmann turbine, injection turbine) and which significantly influences the quantity of the pressurized nitrogen or liquid product, which are able to be removed overall from the plant. The quantity of the liquid air product(s) removed in each case is considered below. The quantity is in each case expressed as a liquid nitrogen-equivalent quantity, the latter being calculated from 1.08 times the removed liquid oxygen quantity plus the removed liquid nitrogen quantity. The liquid nitrogen-equivalent quantity is expressed in standard cubic meters per hour. In a first alternative, in this case, the compression of the second quantity of air prior to the cooling thereof and expansion thereof to the second pressure level is performed to a pressure level which is above the first pressure level, in particular 1 to 11 bar above the first pressure level, for example is 6 to 18 bar, wherein one or more liquid air products is or are removed from the air separation plant to a liquid nitrogen-equivalent quantity which corresponds to up to 3.5 mole percent of a substance quantity supplied overall to the distillation column system and which corresponds in particular to more than 1.5 mole percent of the substance quantity supplied overall to the distillation column system. Here, the nitrogen-rich pressurized product(s) are formed using fluid removed from the high-pressure column. In this configuration of the present invention, it is thus possible for a relatively large quantity of corresponding products to be provided. The compression of the second quantity of air to the pressure level above the first pressure level may in this case likewise be performed in the main air compressor if the latter provides a corresponding end pressure. In this case, further air streams, for example the first quantity of air, can be removed from a corresponding main air compressor at a suitable equal or lower pressure level. It is likewise possible for the compression to firstly be performed in the main air compressor to a lower pressure level, wherein then post-compression in one or more boosters or corresponding post-compressors may be realized.

By contrast, in a second alternative, the compression of the second quantity of air prior to the cooling thereof and expansion thereof to the second pressure level is performed only to the first pressure level, wherein one or more liquid air products is or are removed from the air separation plant to a liquid nitrogen-equivalent quantity which corresponds to up to 1.7 mole percent of a substance quantity supplied overall to the distillation column system and which corresponds in particular to more than 0.7 mole percent of the substance quantity supplied overall to the distillation column system. In this configuration of the present invention, it is thus possible for a smaller quantity of corresponding products than above to be provided. The compression may be performed in any desired manner, in particular in a main air compressor. Further air fractions, in particular the first air fraction, may in this case be compressed to the same pressure level or a higher pressure level.

Finally, in the context of the present invention, provision may however also be made in a third alternative for the compression of the second quantity of air prior to the cooling thereof and expansion thereof to the second pressure level to be performed to a pressure level which is below the first pressure level, wherein one or more liquid air products is or are removed from the air separation plant to a liquid nitrogen-equivalent quantity which corresponds to up to 1.0 mole percent of a substance quantity supplied overall to the distillation column system and which corresponds in particular (without consideration of safety flushing quantities) to more than 0.0 mole percent of the substance quantity supplied overall to the distillation column system. This configuration of the present invention is therefore suitable for those cases in which it is intended to provide extremely small quantities of corresponding products. The compression may be realized here in particular in the main air compressor, from which, in this case, the second quantity of air may be removed in particular at an intermediate pressure level. Here, it is particularly expedient in terms of energy if the air post-compression is still realized before the air purification. Here, the air purification would consist of two adsorber stations operating at different pressures (known from WO2013/053425A2). In particular, if the compression of the second quantity of air prior to the cooling thereof and expansion thereof to the second pressure level is performed to a pressure level which is below the first pressure level, corresponding compression of the first quantity of air prior to the at least partial liquefaction in the condenser-evaporator a pressure level below the first pressure level may possible. The respective pressure levels below the first pressure level may in this case in particular be equal to one another.

In all the elucidated cases, it is therefore possible to adapt the configuration of the method according to the invention to the in each case desired pressure of the gaseous third liquid, which is removed from the mass transfer column or from the air separation plant or from the cold box thereof, that is to say of an oxygen-rich pressurized product, and to the in each case desired quantity of one or more nitrogen-rich pressurized products and/or one or more liquid products. In this case, in summary, the compression of the first quantity of air, that is to say that quantity of air which is then at least partially liquefied in the condenser-evaporator of the mass transfer column, to the first pressure level or to a higher or lower pressure level (the latter in particular in the case of the at least partially liquefied air being fed into the low-pressure column and in the case of relatively low product pressures) and the compression of the second quantity of air, that is to say that quantity of air which is then subsequently expanded in particular in an expansion turbine and fed into the low-pressure column, to a pressure level which is above, at or below the first pressure level may be realized. By contrast, a further quantity of air, which is fed into the high-pressure column after being conducted through the main heat exchanger and which, upstream of the main heat exchanger and upstream of the high-pressure column, is not subjected to further pressure and/or temperature-influencing measures, is advantageously compressed to the first pressure level upstream of the main heat exchanger. Depending on the pressure level to be attained, a main air compressor be used on its own or a combination of a main air compressor and one or more boosters and/or post-compressors be used.

In another configuration of the present invention, it is also possible for a corresponding previously compressed and cooled second quantity of air to be expanded to the first pressure level and fed into the high-pressure column, wherein the compression of the second quantity of air prior to the cooling thereof and expansion thereof to the first pressure level is in this case performed to a pressure level which is above the first pressure level, and wherein furthermore, one or more gaseous, nitrogen-rich pressurized products is or are in this case removed from the air separation plant to a total quantity which corresponds to up to 30 mole percent of a substance quantity supplied overall to the distillation column system.

According to the present invention, a liquid fifth fluid with a fifth oxygen content, between the third and fourth oxygen contents, is removed from the mass transfer column and is at least partly fed into the low-pressure column. The fifth fluid is removed from the mass transfer column between a feed point for the first fluid and a feed point for the oxygen-enriched liquid. According to the invention, the fifth fluid or the fraction thereof fed into the low-pressure column is fed into the low-pressure column at a position which is situated below a position at which the fourth fluid or the fraction thereof fed into the low-pressure column is fed into the low-pressure column. The two positions are advantageously one or more separation regions or separation sections apart from one another. If the mass transfer column has a total number of theoretical or practical trays of 5 to 40, a removal point for the fifth fluid may be situated in particular 10 to 30 theoretical or practical trays above the bottom of the mass transfer column. As mentioned, the mass transfer column may in this case have a further separation section. According to a particularly preferred embodiment of the present invention, the mass transfer column therefore has a first and a second separation section, which in particular each have mass transfer structures of a suitable type, in particular in the form of separation trays (sieve trays) or in the form of structured or unstructured packings. A collecting structure for liquid, in particular in the form of a so-called cup, by means of which the fifth fluid can be collected and discharged, is arranged between the first and second separation sections. A region which has no mass transfer structures of the elucidated type is in particular arranged between the first and second separation sections.

The removal of the fifth fluid from the mass transfer column and the feeding thereof into the low-pressure column, which may likewise be equipped with a corresponding additional separation section for this purpose, results not only in the liquid/vapor (L/V) ratios in the low-pressure column being better optimized but also in an improvement of the mass transfer in the mass transfer column being achieved, since the concentration profile in the lower column region comes closer to the equilibrium line. As a result, the product pressure of an oxygen-rich air product can be increased without the corresponding air pressure having to be increased at the same time. A fundamental reason for this is that the liquid flowing down in the lower section of the mass transfer column has significantly less oxygen (the liquid thus becomes colder) and lower losses occur when mixing the two liquids.

Additionally, in the context of the present invention, use of a so-called forced-flow condenser-evaporator (in particular in a so-called "ones-through" configuration) as a condenser-evaporator for evaporating the oxygen-enriched liquid removed from the high-pressure column and the bottom liquid of the mass transfer column is proposed.

In a forced-flow condenser-evaporator, a liquid stream is forced through the evaporation space by means of its own pressure and partly evaporated therein. Said pressure is generated for example by a liquid column in the supply line to the evaporator space, and thus purely hydrostatically. Here, the height of said liquid column corresponds to the pressure loss in the evaporation space. The gas-liquid mixture emerging from the evaporation space, separated by phases in a "once-through" condenser-evaporator of said type, is conducted directly onward to the next method step or to a downstream device, and in particular is not introduced into a liquid bath of the condenser-evaporator, from which bath the fraction remaining in liquid form would be drawn in again.

In the method according to the invention, the condenser-evaporator is therefore designed such that, in said condenser-evaporator, a liquid stream comprising at least a part of the oxygen-enriched liquid removed from the high-pressure column and at least a part of the bottom liquid from the mass transfer column is forced through an evaporation space by means of its own pressure, in particular purely hydrostatically, that is to say without additional pressurization by means of a pump (but optionally at a certain hydrostatic pressure or a general base pressure at which the liquid stream is provided, in particular the above-elucidated superatmospheric operating pressure of the mass transfer column), and partly evaporated therein, wherein a fraction not evaporated during the partial evaporation is in particular prevented from flowing through the evaporation space again.

The use of corresponding forced-flow condenser evaporators allows the pressure of the oxygen product obtained in the form of the third fluid in a corresponding plant to be set to be noticeably higher than in the case of conventional designs of condenser-evaporators (so-called "bath" condenser-evaporators). In the context of the present invention, the use of the elucidated types of condenser-evaporators is acceptable because of the high liquid excess and the relatively low oxygen content.

In the context of the present invention, the first fluid can be formed using bottom fluid from the low-pressure column. By contrast, according to a further configuration, the first fluid is formed using a liquid which is removed from the low-pressure column several theoretical or practical trays above the bottom, wherein further liquid is removed from the bottom of the low-pressure column and discharged from the air separation plant. In this way, it is also possible to provide a pure oxygen product in the form of the further liquid removed from the low-pressure column.

In the context of the present invention, as mentioned, in particular pressurized air is injected into the low-pressure column. As mentioned, this contributes to the injection equivalent. Consequently, the quantity thereof can be increased in comparison with known air separation plants having mixing columns. In a method according to a corresponding configuration of the present invention, it is thus possible for compressed and cooled air to be expanded to the second pressure level by means of one or more expansion turbines and fed into the low-pressure column. Here, the air can be compressed to the first pressure level, that is to say the pressure level of the high-pressure column, but also to a higher or lower pressure level, as already elucidated above with reference to the second quantity of air. For the compression, use is made here in particular of a main air compressor of the air separation plant, or said main air compressor is involved together with further compressors or boosters in the compression. The cooling is realized in particular in the main heat exchanger. Prior to and/or following the expansion, a corresponding fraction of air can be cooled, in particular in a main heat exchanger of the air separation plant. The expansion may be realized for example by means of a generator turbine. Alternatively, it is also possible for the expansion to be realized in a turbine which is coupled to a booster and which brings a further fraction of air to an even higher pressure level. Said further fraction of air can in particular be cooled prior to the further compression thereof or supplied to the booster in a warm state. In addition, or as an alternative, to the use of a corresponding booster, the use of a separate post-compressor, which brings a fraction of air to a pressure level higher than the first pressure level is possible.

As elucidated, it is possible in the context of the present invention for the mass transfer column to be charged in particular by means of bottom liquid of the high-pressure column. However, it is also possible for (additional) bottom liquid to be removed from the high-pressure column and, without feeding into the mass transfer column, fed directly, that is to say unchanged in substance composition, into the low-pressure column. This corresponds to the regular operation of an air separation plant.

In a further configuration of the method according to the invention, it is possible for a nitrogen-enriched or nitrogen-rich fluid to be removed in gaseous form from the high-pressure column and then expanded by means of one or more expansion turbines. Thus, use may be made of so-called pressurized nitrogen turbines, as elucidated in the introduction. In particular, the use of so-called impure pressurized nitrogen turbines is also possible. Correspondingly expanded fluids can be fed into the low-pressure column or discharged from the air separation plant. Said fluids contribute to the injection equivalent.

The present invention also extends to an air separation plant having a distillation column system which has a high-pressure column configured for operation at a first pressure level, has a low-pressure column configured for operation at a second pressure level, below the first pressure level, and has a mass transfer column configured for operation at a third pressure level, wherein the air separation plant is configured to subject, in the mass transfer column, a liquid first fluid with a first oxygen content and a gaseous second fluid with a second oxygen content, below the first oxygen content, to mass transfer with one another, to remove a gaseous third fluid with a third oxygen content, reduced in relation to the first oxygen content, from the mass transfer column and to at least partly discharge said third fluid from the air separation plant, to remove a liquid fourth fluid with a fourth oxygen content, corresponding at least to the second oxygen content, from the further mass transfer column and to at least partly feed said fourth fluid into the low-pressure column, and to form the first fluid using at least a part of an oxygen-rich liquid removed from the low-pressure column. The air separation plant is also configured to form the second fluid using an oxygen-enriched liquid removed from the high-pressure column. Moreover, the air separation plant is configured to mix, and, in a condenser-evaporator, partly to evaporate, the oxygen-enriched liquid removed from the high-pressure column and bottom liquid of the mass transfer column.

In this case, in the air separation plant according to the invention, the condenser-evaporator is designed, and incorporated in the air separation plant, such that a liquid stream which comprises at least a part of the oxygen-enriched liquid removed from the high-pressure column and at least a part of the bottom liquid from the mass transfer column is forced through an evaporation space by means of its own pressure and partly evaporated therein, Furthermore, according to the invention, the air separation plant is configured to remove a liquid fifth fluid with a fifth oxygen content, between the third and fourth oxygen contents, from the mass transfer column between a feed point for the first fluid and a feed point for the oxygen-enriched liquid, and to at least partly feed said fifth fluid into the low-pressure column, wherein means are provided, which are configured to feed the fifth fluid or the fraction thereof fed into the low-pressure column into the low-pressure column below the fourth fluid or the fraction thereof fed into the low-pressure column. For the purpose of removing and feeding the fluid streams in the manner provided according to the invention, corresponding means, for example connection lines and the like, are provided. For features and advantages of a corresponding air separation plant, reference should be made expressly to the above elucidations in respect of the method according to the invention and of the different advantageous configurations thereof. A corresponding air separation plant is in particular configured for implementing a corresponding method and has corresponding means.

In the air separation plant according to the invention, the high-pressure column and the low-pressure column are in particular connected to one another in a heat-exchanging manner by means of a multi-level cascade evaporator or a falling film evaporator.

The invention will be elucidated in more detail below with reference to the appended drawings which show preferred embodiments of the invention.

DETAILED DESCRIPTION OF THE DRAWINGS

In the figures, elements which correspond to one another structurally or functionally are denoted by identical reference signs and, for the sake of clarity, will not be elucidated repeatedly. Air separation plants according to preferred embodiments of the present invention will be illustrated in each case on the basis of the figures. However, the corresponding elucidations relate to methods according to preferred configurations of the present invention in the same way, so that, where components of corresponding plants are described below, the corresponding elucidations for the method steps carried out by way of said components apply in the same way. In the figures, liquid substance streams are each illustrated by means of filled (black) flow arrows and gaseous substance streams are each illustrated by means of non-filled (white) flow arrows.

In the description of the figures, the device referred to above as a "mass transfer column" will be referred to simply as a "mixing column". As elucidated, it differs from conventional mixing columns by a series of features.

Figure 1:
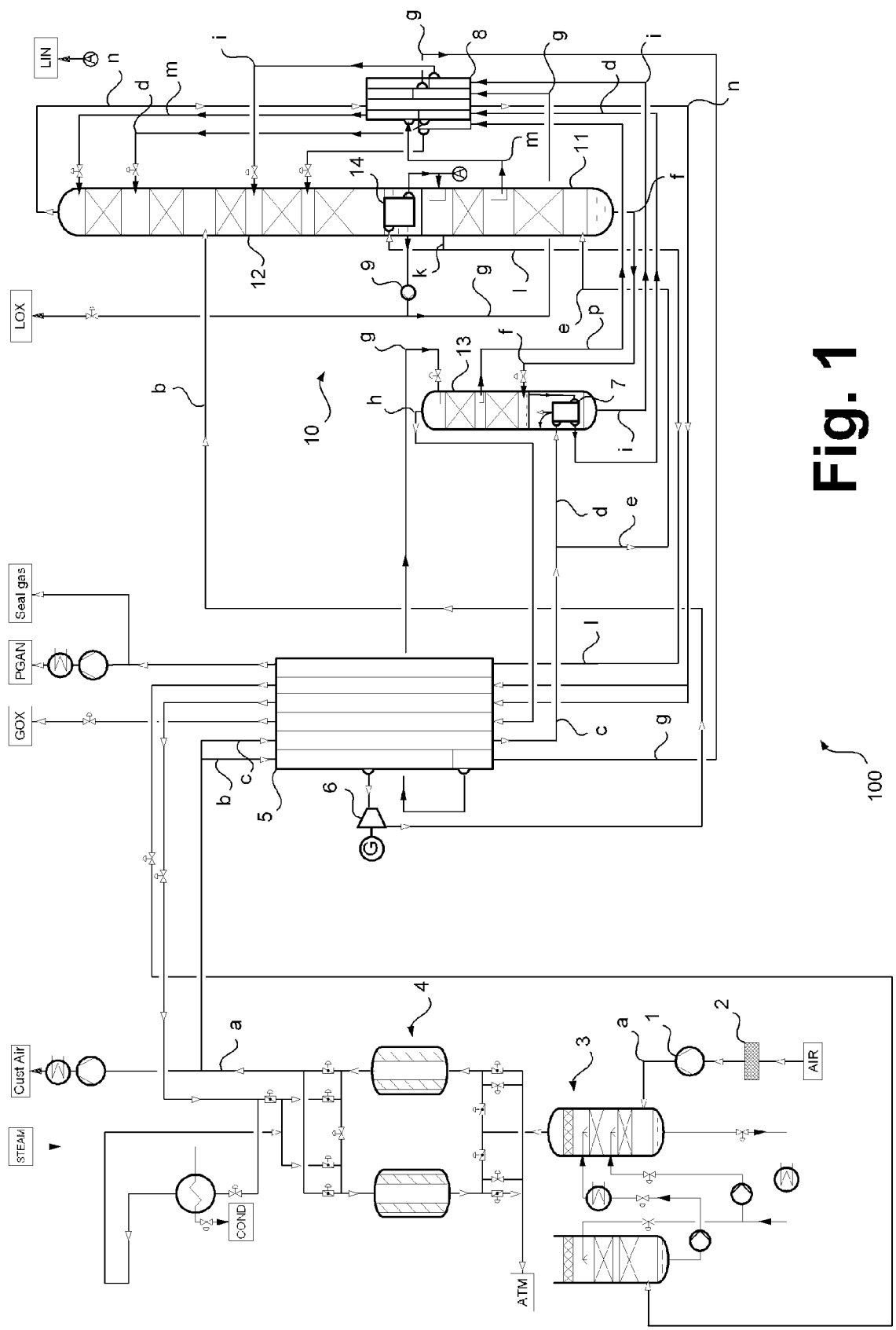
FIG. 1 shows an air separation plant according to one embodiment of the invention in the form of a simplified process flow diagram.

In FIG. 1, an air separation plant according to one embodiment of the present invention is illustrated in the form of a highly simplified process flow diagram and is denoted overall by 100.

In the air separation plant 100, atmospheric air (AIR) is drawn in via a filter 2 by means of a typically multi-stage main air compressor 1 and is supplied as a feed air stream a to a cooling device 3. After cooling there, the feed air stream a is purified in an adsorption unit 4, in particular is freed of water and carbon dioxide. If required, a part of the air of the purified feed air stream, which is still denoted by a, is compressed further and used for providing any desired air consumers (Cust Air) with a supply.

In the air separation plant 100, a fraction of the feed air stream a is, as a so-called injection stream b, firstly cooled to an intermediate temperature level in a main heat exchanger 5 of the air separation plant 100, expanded in a turboexpander 6 (Lachmann turbine), which is coupled to a generator G, and fed into a low-pressure column 12 of a distillation column system 10, which also has a high-pressure column 11 and a mixing column 13.

In the air separation plant 100, a further fraction of the feed air stream a is, in the form of a substance stream c, cooled to an end temperature level in the main heat exchanger 5 of the air separation plant 100 and is subsequently divided, in a still gaseous state, into two partial streams d and e.

The partial stream d is liquefied in a condenser-evaporator 7, the latter, in the illustrated example, being arranged in a lower region of the mixing column 13 and, as elucidated above, designed in the form of a forced-flow condenser-evaporator, is conducted through a counter-current subcooler 8, and is expanded into the low-pressure column 12. The partial stream e is fed into a lower region of the high-pressure column 11.

Oxygen-enriched liquid is drawn off in the form of a substance stream f from a bottom region of the high-pressure column 11 and expanded into a lower region of a mass transfer region of the mixing column 13. Said stream is thus used instead of a feed air stream, which is conventionally supplied to a mixing column 13. In the mixing column 13, in particular the condenser-evaporator 7, evaporating liquid is passed in countercurrent to a substance stream g, the latter being introduced in liquid form in an upper region of the mass transfer region of the mixing column 13.

For the purpose of forming the substance stream g, oxygen-enriched liquid is removed from the low-pressure column 12 from the bottom, pressurized by means of a pump 9, conducted through the counter-current subcooler 8 and heated to an intermediate temperature level in the main heat exchanger 5. Further oxygen-enriched liquid removed from the low-pressure column 12 from the bottom and pressurized by means of the pump 9 can be discharged from the air separation plant 100 as a liquid oxygen product (LOX).

A gas mixture drawn off from the top of the mass transfer region of the mixing column 13 is, in the form of a substance stream h, completely heated in the main heat exchanger 5, expanded and provided as a gaseous oxygen product (GOX) at a pressure level of, for example, approximately 3.2 bar (abs.).

Liquid from the bottom of the mass transfer region of the mixing column 13 is partly evaporated in the condenser-evaporator 7. In this case, the condenser-evaporator 7 is supplied with a liquid stream in the form of the liquid from the bottom of the mass transfer region of the mixing column 13, which liquid stream comprises at least a part of the oxygen-enriched liquid removed from the high-pressure column 11 and at least a part of the bottom liquid from the mass transfer column 13. The liquid stream is forced through the evaporation space of the condenser-evaporator 7 by means of its own pressure and partly evaporated therein. The evaporated fraction rises into the mass transfer region, and the non-evaporated fraction is, together with liquid trickling down in the mixing column 13, drawn off in the form of a substance stream i. The substance stream i is conducted through the counter-current subcooler 8 and expanded into a central region of the low-pressure column 12.

In the illustrated example, the mixing column 13 has two separation sections. A liquid substance stream p is drawn off from an intermediate region of the mixing column 13 and, in particular, is, as illustrated, subcooled and fed into the low-pressure column 12, the latter likewise being able to be provided with a further separation section. Consequently, a liquid fifth fluid is removed in the form of the substance stream p from the mass transfer column 13 between the feed points for the substance streams f and g and is at least partly fed into the low-pressure column 12. The feeding into the low-pressure column 12 is realized here below the substance stream i.

Nitrogen-rich gas from the top of the high-pressure column 11 is drawn off in the form of a substance stream k from the high-pressure column 11. A part thereof is, in the form of a substance stream I, heated in the main heat exchanger 5 and, following optional further compression, is provided in the form of a gaseous pressurized nitrogen product (PGAN) and/or used as a seal gas.

A further part of the nitrogen-rich gas drawn off in the form of the substance stream k from the top of the high-pressure column 11 is liquefied in a main condenser 14, which connects the high-pressure column 11 and the low-pressure column 12 in a heat-exchanging manner, and is partly recycled as reflux to the high-pressure column 11 and partly (see link A) provided as liquid nitrogen product (LIN). The main condenser 14 may in particular be in the form of a multi-level cascade evaporator, as described for example in DE 10 2010 051 526 A1.

Furthermore, a liquid nitrogen-enriched substance mixture is drawn off in the form of a substance stream m from an intermediate region of the high-pressure column 11, conducted through the counter-current subcooler 8 and expanded into the low-pressure column 12.

So-called impure nitrogen is drawn off in the form of a substance stream n from the top of the low-pressure column and is conducted through the counter-current subcooler 8. After being divided into two partial streams and being heated in the main heat exchanger 5, said impure nitrogen can be used as regeneration gas, or cooling gas, in the cooling device 3 or the adsorption unit 4.

Figure 2:
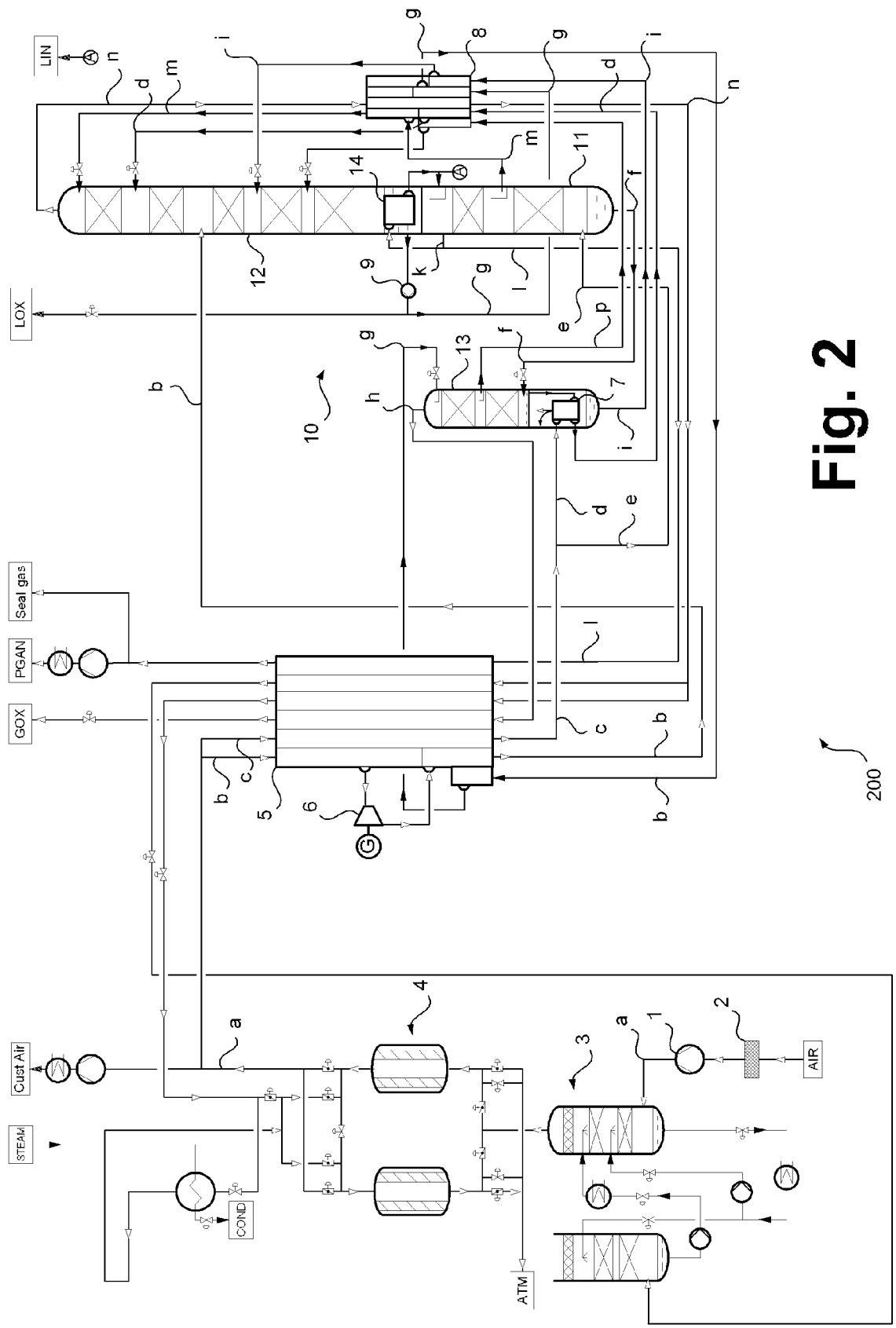
FIG. 2 shows an air separation plant according to one embodiment of the invention in the form of a simplified process flow diagram.

In FIG. 2, an air separation plant according to a further embodiment of the present invention is illustrated in the form of a highly simplified process flow diagram and is denoted overall by 200.

The air separation plant 200 illustrated in FIG. 2 differs from the air separation plant 100 illustrated in FIG. 1 essentially in that the partial stream b of the feed air here is cooled further in the main heat exchanger 5 after it has been expanded in the expansion turbine 6.

Figure 3:
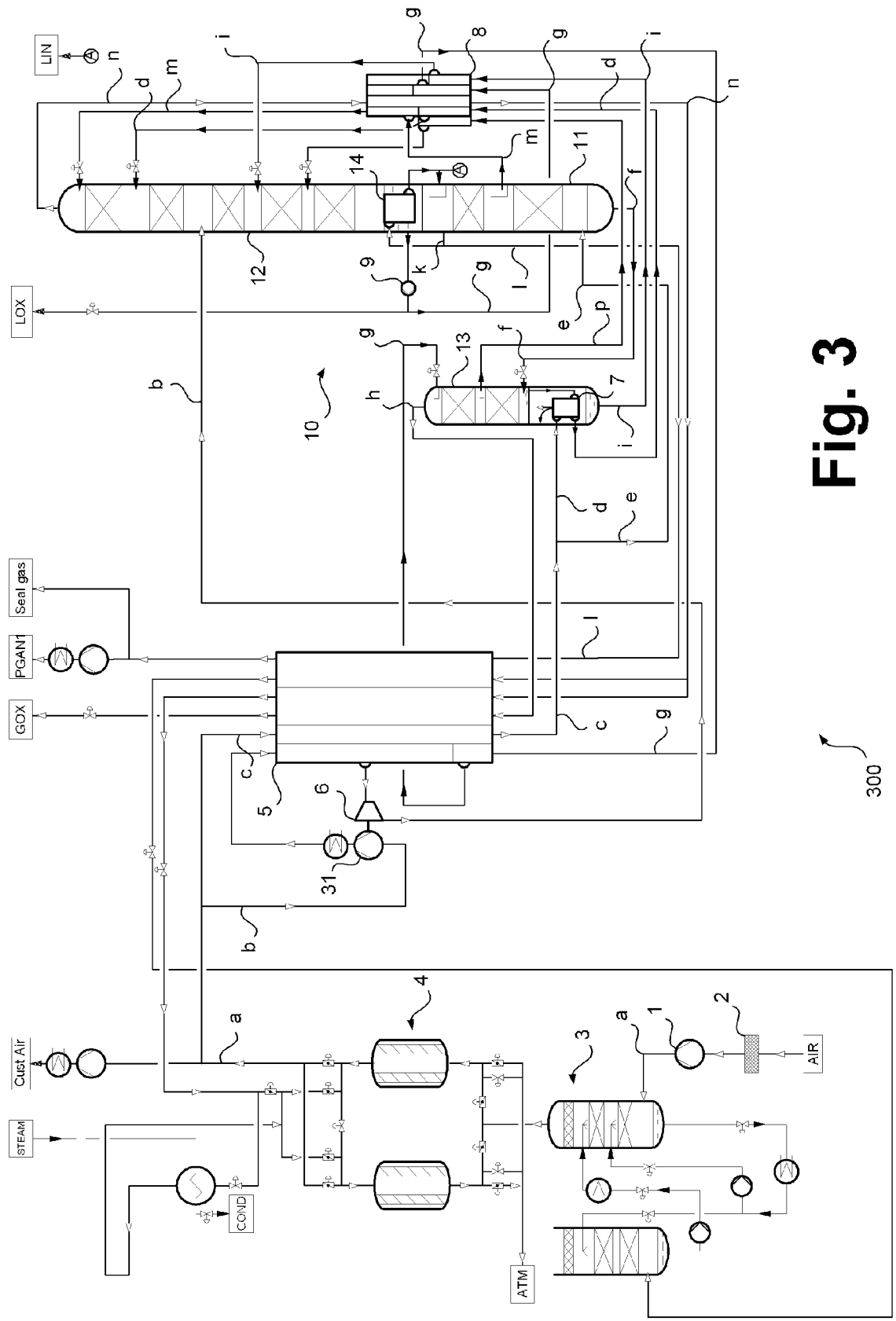
FIG. 3 shows an air separation plant according to one embodiment of the invention in the form of a simplified process flow diagram.

In FIG. 3, an air separation plant according to a further embodiment of the present invention is illustrated in the form of a highly simplified process flow diagram and is denoted overall by 300.

The air separation plant 300 illustrated in FIG. 3 differs from the air separation plant 100 illustrated in FIG. 1 essentially in that the partial stream b of the feed air here is compressed in a booster 21, which is mechanically coupled to the expansion turbine 6, before being cooled to the intermediate temperature level in the main heat exchanger 5. In this way, it is possible to realize a reduction in the injection quantity with increased removal of the gaseous pressurized nitrogen product (PGAN).

Figure 4:
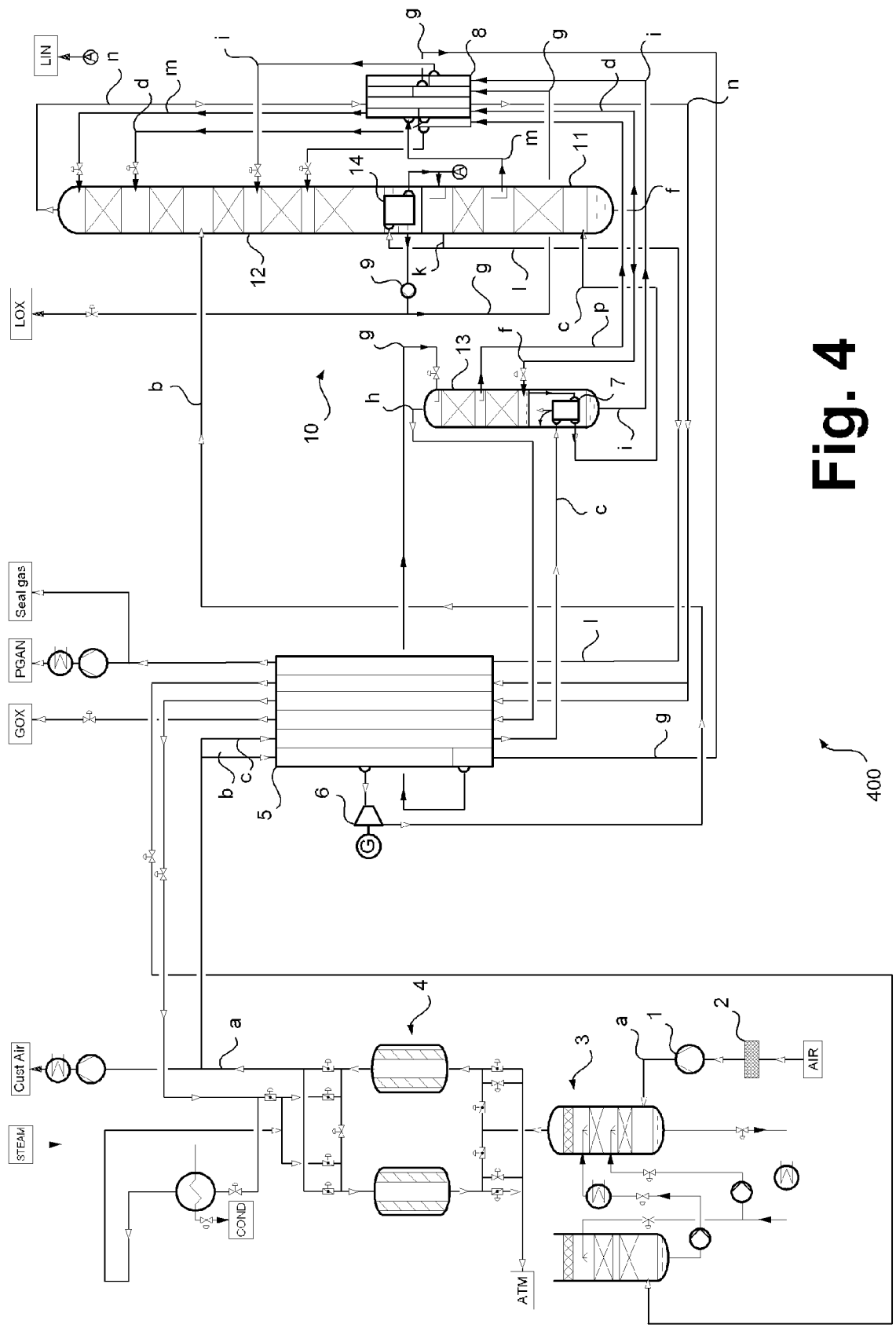
FIG. 4 shows an air separation plant according to one embodiment of the invention in the form of a simplified process flow diagram.

In FIG. 4, an air separation plant according to a further embodiment of the present invention is illustrated in the form of a highly simplified process flow diagram and is denoted overall by 400.

The air separation plant 400 illustrated in FIG. 4 differs from the air separation plant 100 illustrated in FIG. 1 essentially in that the partial stream c of the feed air is not divided into the two partial streams d and e. It is rather the case here that the entire partial stream c is partly condensed in the condenser-evaporator 7 and fed into the high-pressure column 11. This makes it possible for the gaseous oxygen product (GOX) to be provided at a higher pressure level, namely at a pressure level of, for example, up to approximately 4.0 bar (abs.), at a temperature difference in the condenser 14 of approximately 1K.

Figure 5A:
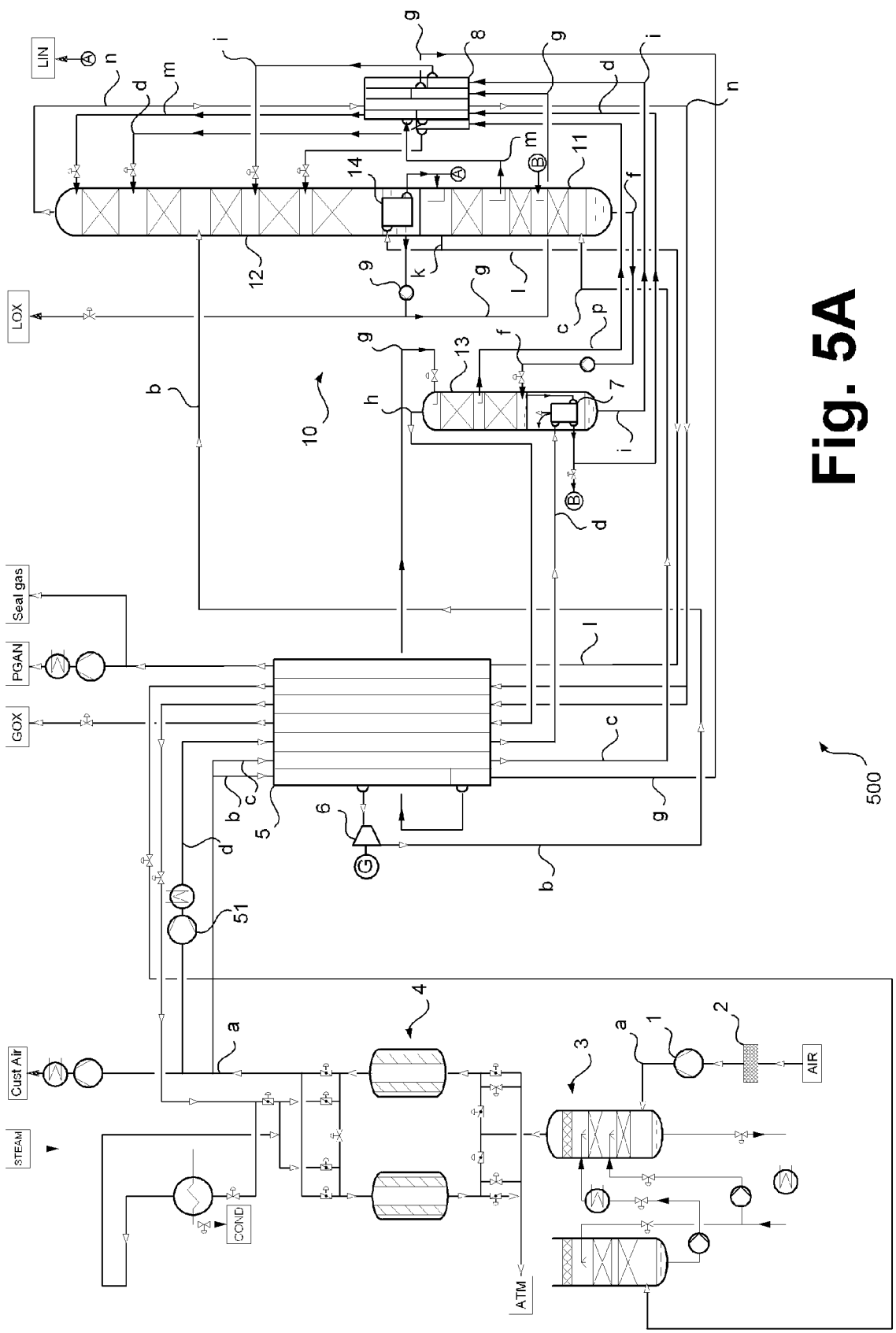
FIG. 5A shows an air separation plant according to one embodiment of the invention in the form of a simplified process flow diagram.

In FIG. 5A, an air separation plant according to a further embodiment of the present invention is illustrated in the form of a highly simplified process flow diagram and is denoted overall by 500.

The air separation plant 500 illustrated in FIG. 5A differs from the air separation plants 100 illustrated in FIG. 1 essentially in that use is made of a post-compressor 51. Said post-compressor may in particular be designed, together with the main air compressor 1, in the form of a single multi-stage machine, from which the partial stream b is removed at an intermediate pressure. It compresses a partial stream of the feed air further, which partial stream corresponds to the partial stream d and is likewise denoted here by d. This likewise makes is possible for the gaseous oxygen product (GOX) to be provided at a higher pressure level.

As illustrated further in FIG. 5A, here, the air liquefied in the condenser-evaporator 7 of the mixing column 13 is also partly (see link B) fed into the high-pressure column 11.

Figure 5B:
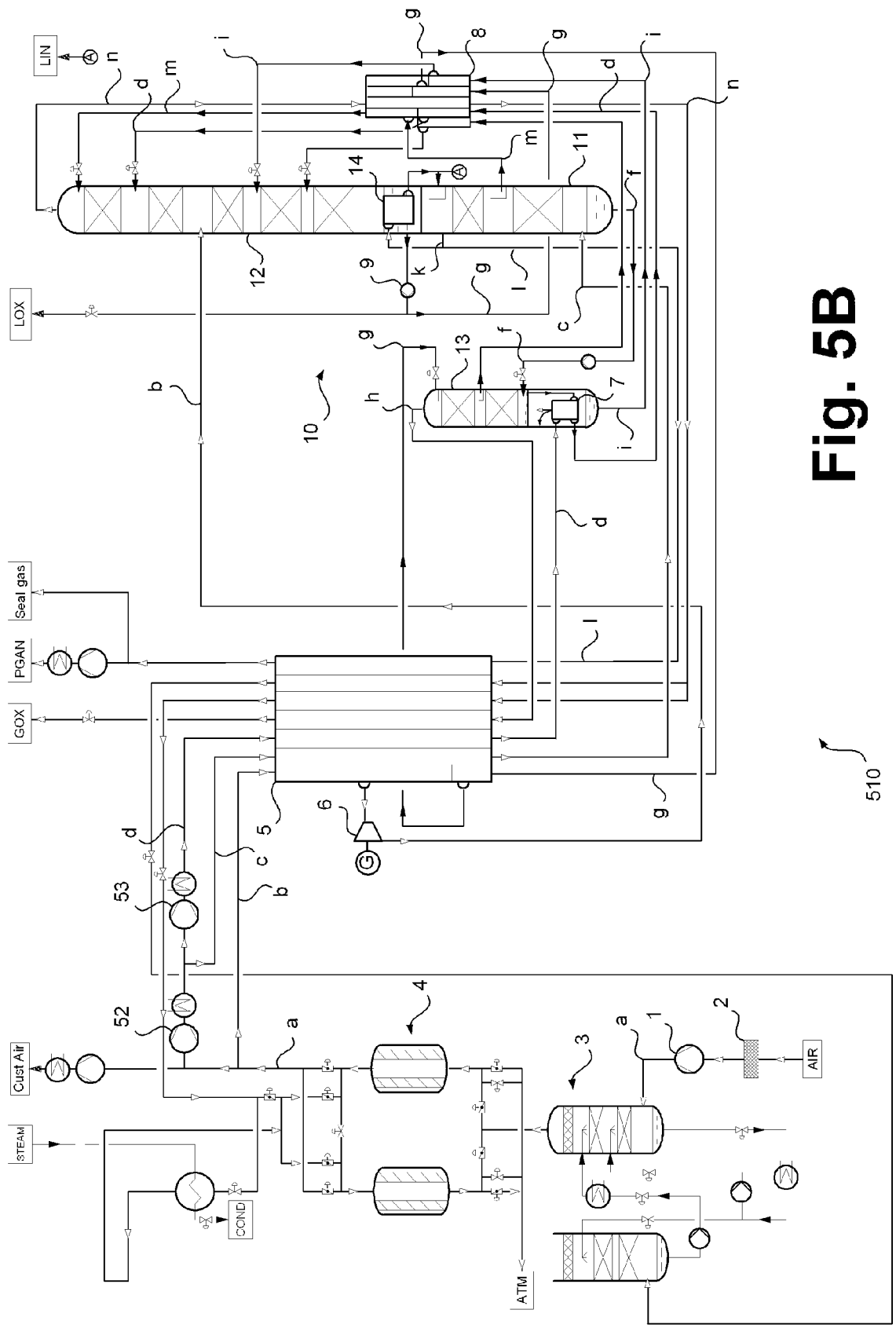
FIG. 5B shows an air separation plant according to one embodiment of the invention in the form of a simplified process flow diagram.

In FIG. 5B, an air separation plant according to a further embodiment of the present invention is illustrated in the form of a highly simplified process flow diagram and is denoted overall by 510. The air separation plant 510 constitutes a variant of the air separation plants 500 according to FIG. 5A.

The air separation plant 510 illustrated in FIG. 5B differs from the air separation plants 500 illustrated in FIG. 5A essentially in that, instead of a post-compressor 51, use is made of two post-compressors 52 and 53. Said two post-compressors may likewise be designed, together with the main air compressor 1, in the form of a single multi-stage machine, from which the partial stream b is removed at an intermediate pressure. Here, firstly the post-compressor 52 compresses a quantity of air which corresponds to the sum of the partial streams likewise denoted here by c and d. The partial stream c is cooled at a corresponding pressure level, which it reaches by way of the compression in the post-compressor 52. The partial stream d is compressed further in the post-compressor 53 and subsequently cooled. The variant illustrated in FIG. 5B of the air separation plant 510 is provided in particular for relatively low liquid production or production of a gaseous pressurized nitrogen product (PGAN), with the result that the injection stream, that is to say the partial stream b, is compressed to a relatively low pressure level.

The feed air for the high-pressure column 11, that is to say the partial stream c, is compressed to the pressure level thereof. The variant illustrated in FIG. 5B of the air separation plant 510 is also likewise provided for providing the gaseous oxygen product (GOX) at a higher pressure level. The air of the partial stream d is therefore correspondingly compressed further.

Figure 5C:
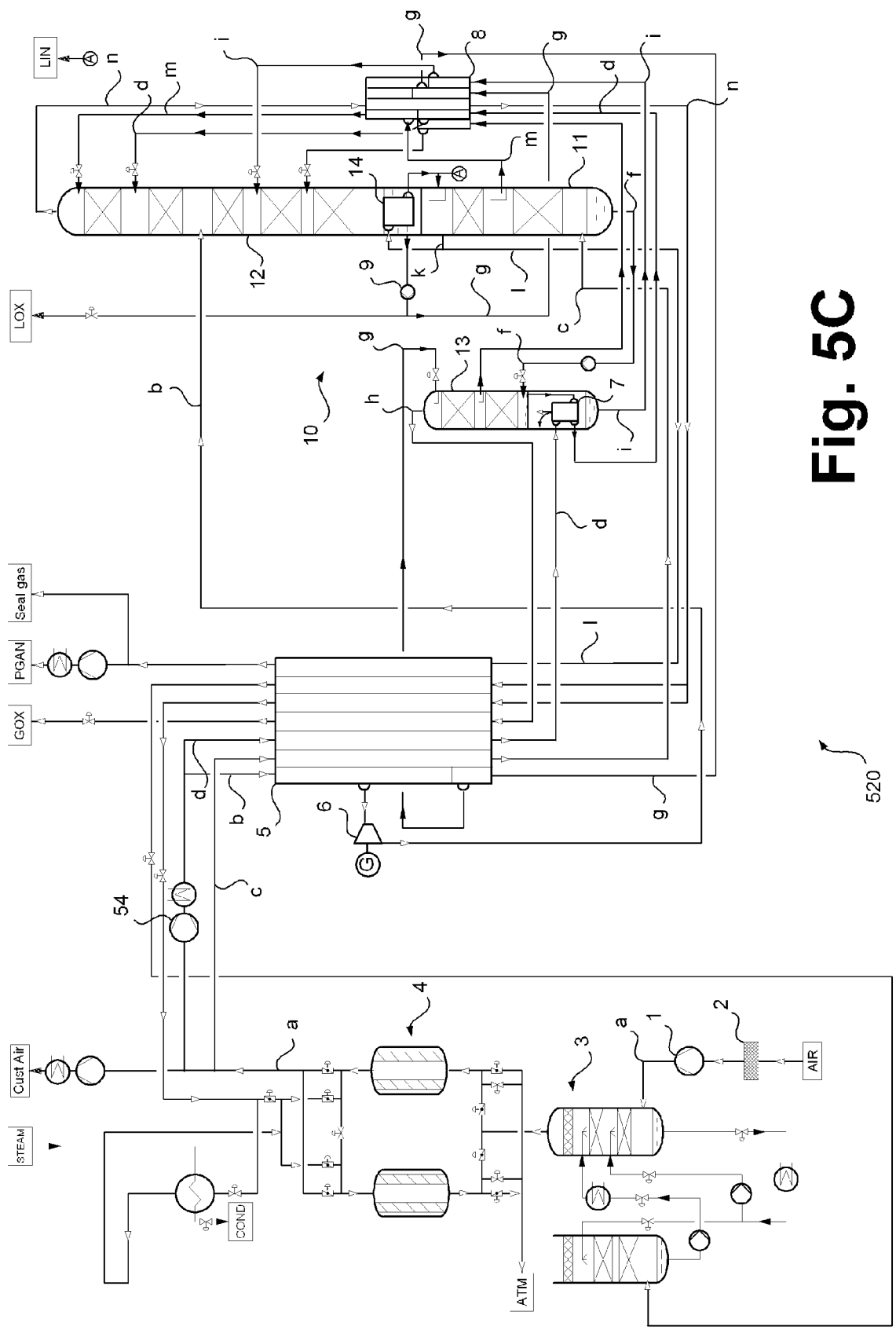
FIG. 5C shows an air separation plant according to one embodiment of the invention in the form of a simplified process flow diagram.

In FIG. 5C, an air separation plant according to a further embodiment of the present invention is illustrated in the form of a highly simplified process flow diagram and is denoted overall by 520. The air separation plant 520 constitutes a further variant of the air separation plant 500 according to FIG. 5A.

The air separation plant 520 illustrated in FIG. 5C differs from the air separation plants 500 illustrated in FIG. 5A essentially in that, instead of a post-compressor 51, use is made of a post-compressor 54. The latter may likewise be designed, together with the main air compressor 1, in the form of a single multi-stage machine, from which however in the present case it is then the case that a partial stream of the feed air, which partial stream corresponds to the partial stream c, is removed at an intermediate pressure. The post-compressor 54 compresses a quantity of air which corresponds to the sum of the partial streams likewise denoted here by b and d. The partial streams b and d are cooled at a corresponding pressure level, which they reach by way of the compression in the post-compressor 54.

The variant illustrated in FIG. 5C of the air separation plant 520 is provided in particular for relatively high liquid production or production of a gaseous pressurized nitrogen product (PGAN). The gaseous oxygen product (GOX) is in this case produced under a higher pressure, and for this reason the common post-compression of the partial streams b and d is performed. The expansion turbine 6 be designed to have a booster stage.

Figure 6:
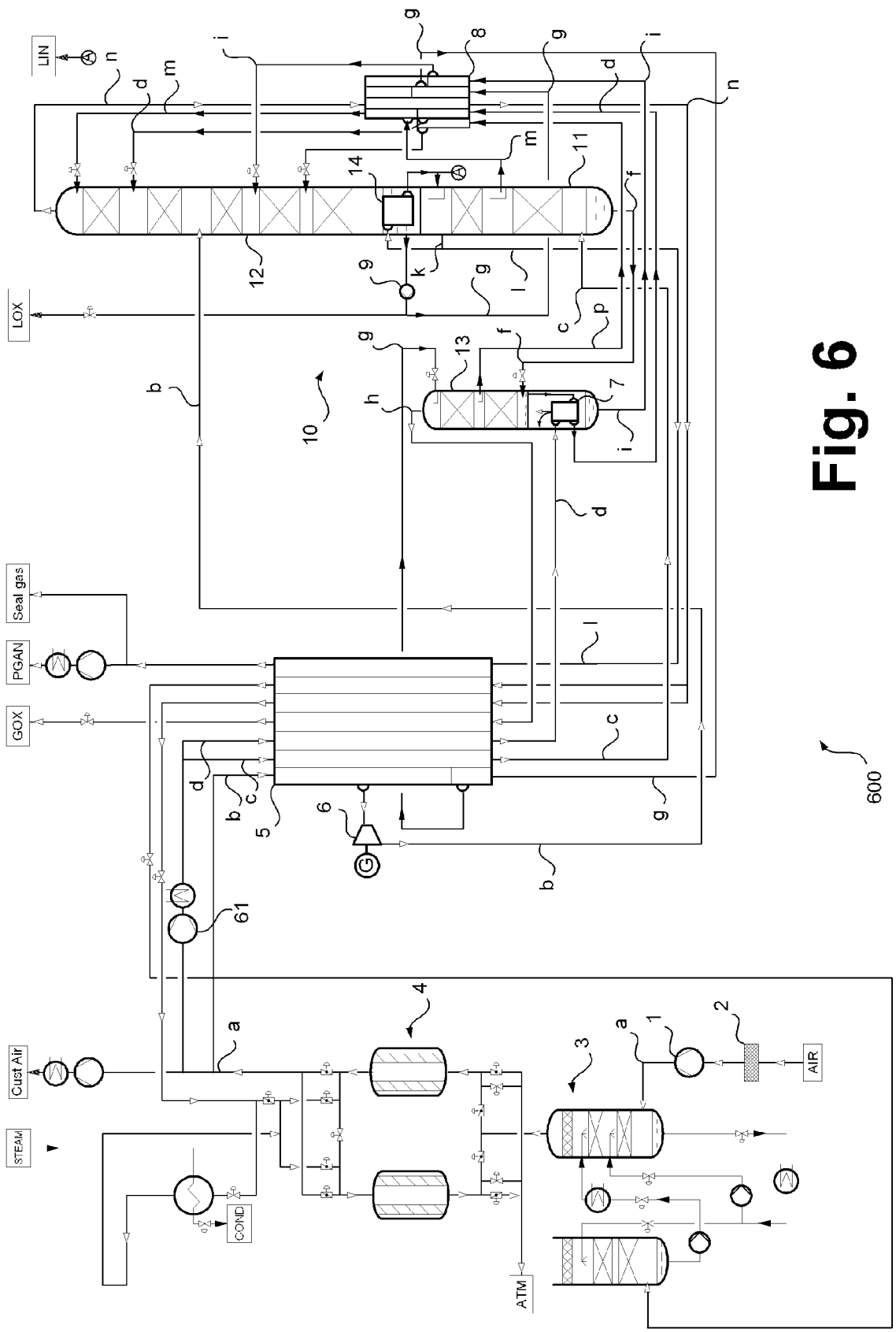
FIG. 6 shows an air separation plant according to one embodiment of the invention in the form of a simplified process flow diagram.

In FIG. 6, an air separation plant according to a further embodiment of the present invention is illustrated in the form of a highly simplified process flow diagram and is denoted overall by 600.

The air separation plant 600 illustrated in FIG. 6 differs from the air separation plants 500 illustrated in FIG. 5 essentially in that use is made of a post-compressor 61 which compresses a partial stream of the feed air further, which partial stream corresponds to the partial stream c and is likewise denoted here by c, and which compresses a partial stream of the feed air further, which partial stream corresponds to the partial stream d and is likewise denoted here by d. In this configuration too, the main air compressor 1 and the post-compressor 61 may in particular be designed in the form of a single multi-stage machine, from which the partial stream b is removed at an intermediate pressure.

The air separation plant 600 illustrated in FIG. 6 is particularly suitable if low quantities of liquid products or of a gaseous pressurized nitrogen product (PGAN) are formed, and in the case of an oxygen product pressure which is comparable with that in the air separation plant 100 according to FIG. 1. The turbine quantity, that is to say the quantity of air expanded in the turboexpander 6, is large in this case, but the cooling power is relatively low since the pressure gradient at the turboexpander is relatively low. In this case, relatively large (main) heat exchangers also necessary in some cases, but the efficiency remains very high since the turbine quantity is not compressed at the same time to the end pressure.

Figure 7:
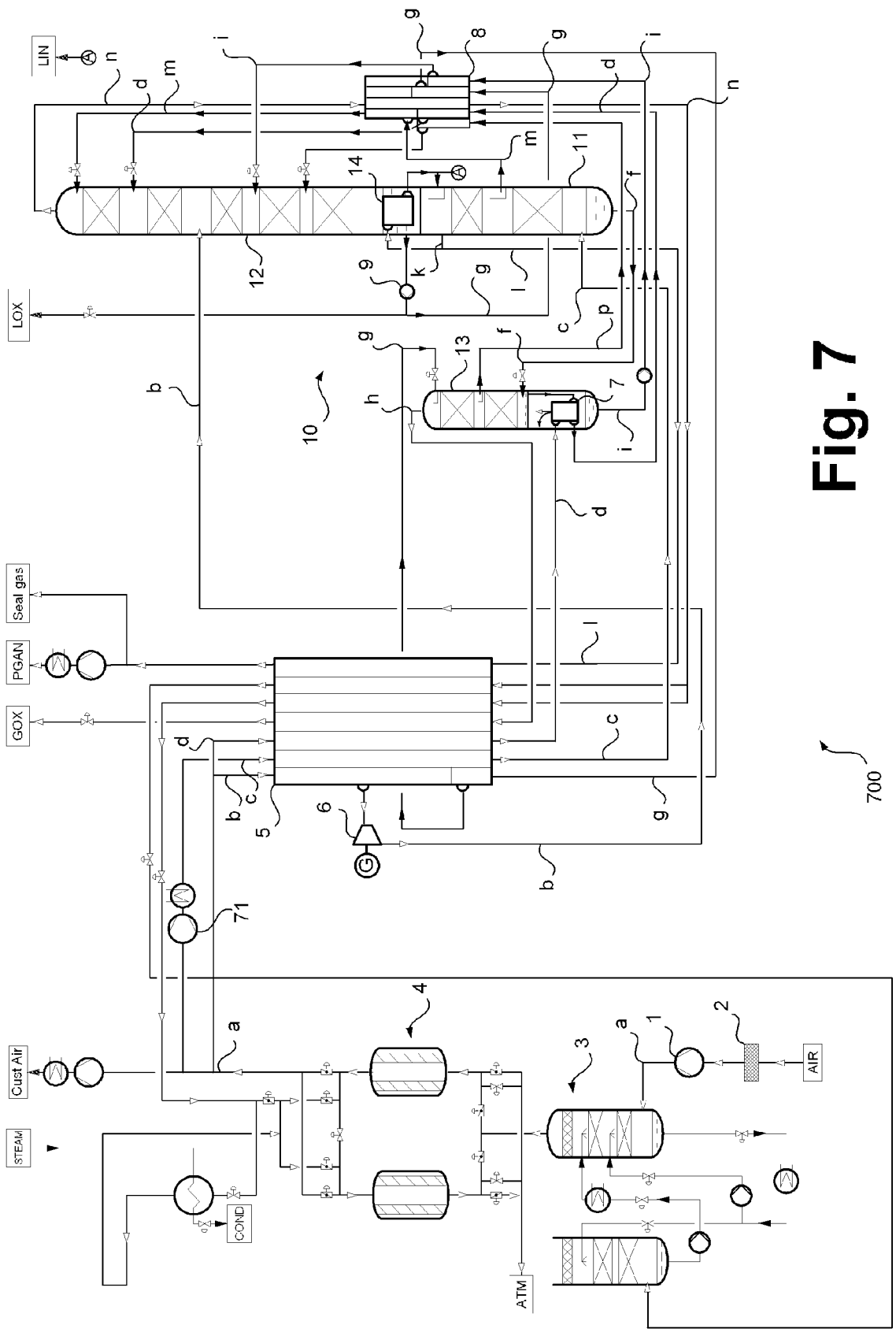
FIG. 7 shows an air separation plant according to one embodiment of the invention in the form of a simplified process flow diagram.

In FIG. 7, an air separation plant according to a further embodiment of the present invention is illustrated in the form of a highly simplified process flow diagram and is denoted overall by 700.

The air separation plant 700 illustrated in FIG. 7 differs from the air separation plants 500 illustrated in FIG. 5 essentially in that use is made of a post-compressor 71 which, however, compresses only one partial stream of the feed air further, which partial stream corresponds to the partial stream c and is likewise denoted here by c. This configuration is suitable in particular for those cases in which, apart from low quantity of liquid products or a low quantity of a gaseous pressurized nitrogen product (PGAN), it is intended to provide the gaseous oxygen product (GOX) at a pressure level of less than approximately 3.2 bar (abs.).

Figure 8:
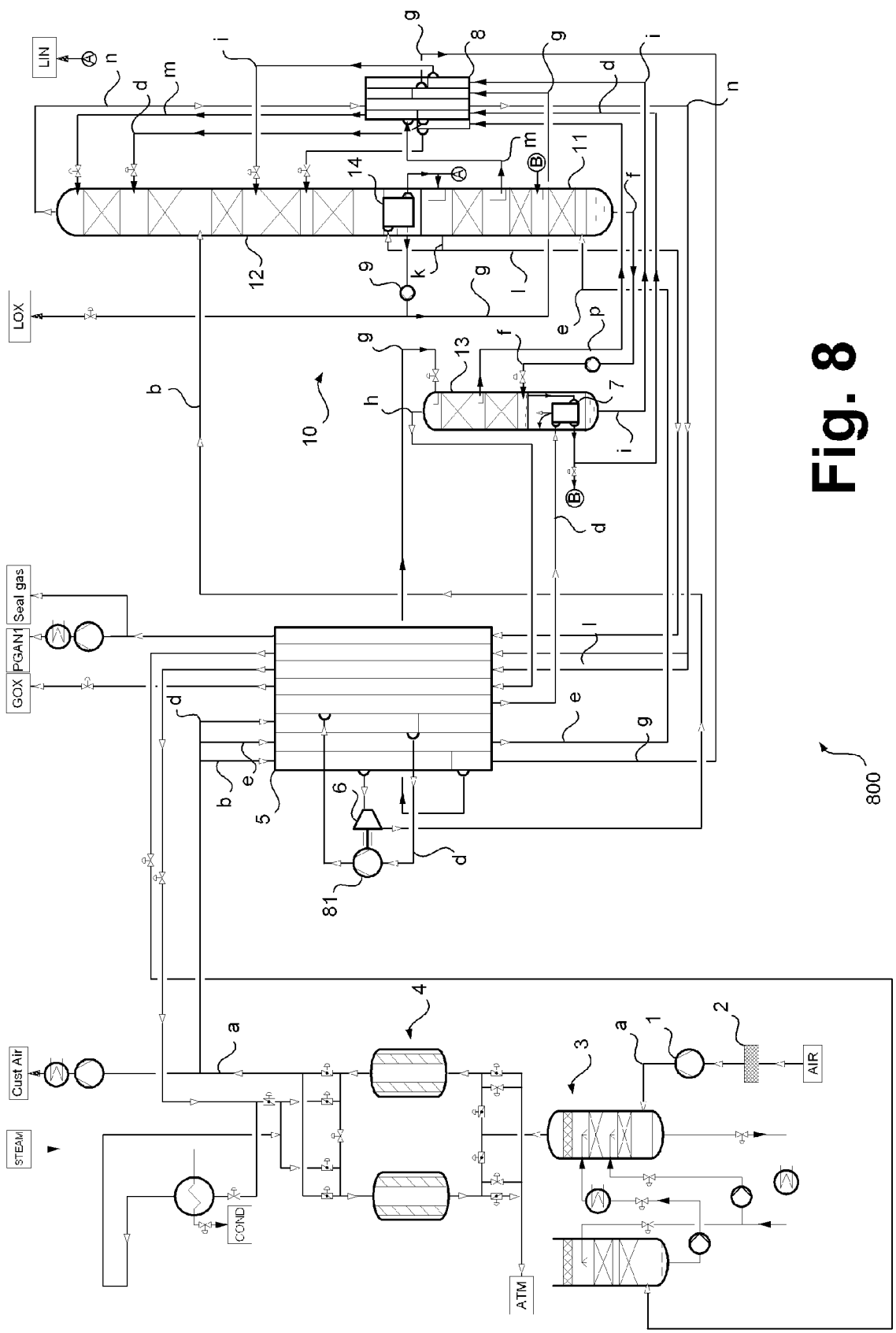
FIG. 8 shows an air separation plant according to one embodiment of the invention in the form of a simplified process flow diagram.

In FIG. 8, an air separation plant according to a further embodiment of the present invention is illustrated in the form of a highly simplified process flow diagram and is denoted overall by 800.

The air separation plant 800 illustrated in FIG. 8 differs from the air separation plant 100 illustrated in FIG. 1 essentially in that use is made of a cold booster 81 which compresses a partial stream of the feed air further, which partial stream corresponds to the partial stream d and is likewise denoted here by d and was previously cooled in the main heat exchanger 5.

In the configuration of the air separation plant 800 according to FIG. 8, merely one pressure level prevails at the main heat exchanger (or only one compressor is used), a higher oxygen product pressure however nevertheless being obtained. The increase in the pressure of the air stream d to be condensed in the condenser-evaporator 7 of the mixing column 13 is realized by means of a cold booster 81. The (main) heat exchanger 5 is in this case of relatively large design, and the excess cooling power is practically converted into the higher pressure. The advantage is that no additional compressor unit or compressor stage has to be used. The unit composed of turboexpander 6 and cold booster 81 may additionally be coupled to a generator or an oil brake.

As illustrated further in FIG. 8, here, as in the configuration according to FIG. 5, the air liquefied in the condenser-evaporator 7 of the mixing column 13 is also partly (see link B) fed into the high-pressure column 11.

Figure 9:
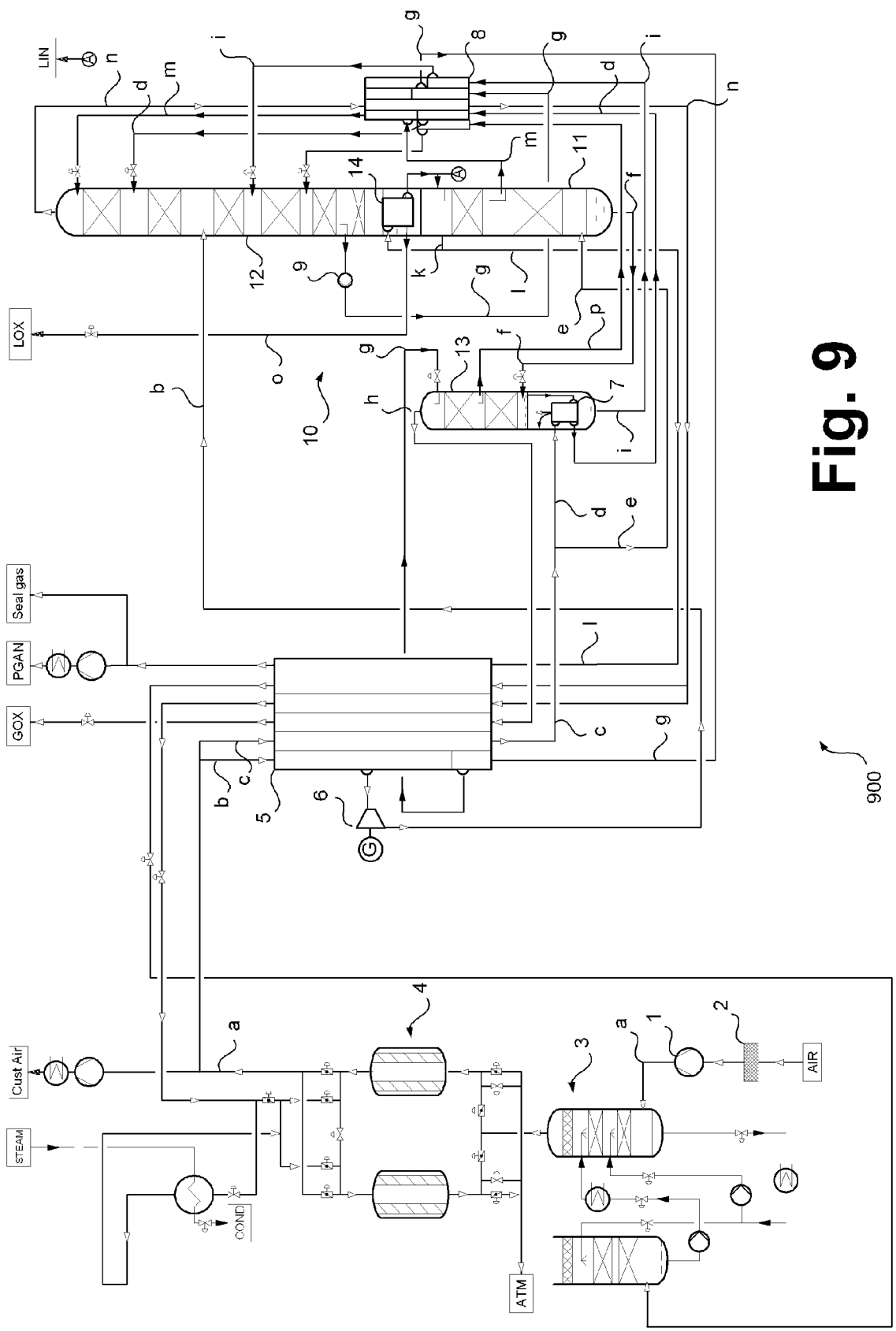
FIG. 9 shows an air separation plant according to one embodiment of the invention in the form of a simplified process flow diagram.

In FIG. 9, an air separation plant according to a further embodiment of the present invention is illustrated in the form of a highly simplified process flow diagram and is denoted overall by 900.

The air separation plant 800 illustrated in FIG. 9 differs from the air separation plant 100 illustrated in FIG. 1 essentially in that the substance stream g is formed by using liquid which is removed above the bottom of the low-pressure column 12. Here, pure oxygen with an oxygen content of approximately 99.5% is removed in the form of a substance stream o from the bottom of the low-pressure column 12 and is provided as the liquid oxygen product (LOX). In particular, the substance stream o can be conducted through the counter-current subcooler 8.

The invention claimed is:

1. A method for cryogenic separation of air using an air separation plant (100-900) having a distillation column system (10) which has a high-pressure column (11) operated at a first pressure level, a low-pressure column (12) operated at a second pressure level, which is below the first pressure level, and a mass transfer column (13) operated at a third pressure level, said method comprising:

subjecting a liquid first fluid with a first oxygen content and a gaseous second fluid with a second oxygen content, which is below the first oxygen content, to mass transfer with one another in the mass transfer column (13), removing a gaseous third fluid with a third oxygen content, reduced in relation to the first oxygen content, from the mass transfer column (13) and at least partially discharging the gaseous third fluid from the air separation plant (100-900), removing a liquid fourth fluid with a fourth oxygen content, corresponding at least to the second oxygen content, from the mass transfer column (13) and at least partially feeding the fourth fluid into the low-pressure column (12), wherein the first fluid is formed using at least a part of an oxygen-rich liquid removed from the low-pressure column (12), wherein the gaseous second fluid is formed using an oxygen-enriched liquid removed from the high-pressure column (11), and wherein the oxygen-enriched liquid removed from the high-pressure column (11) and bottom liquid of the mass transfer column (13) are mixed in the mass transfer column (13) and, by means of a condenser-evaporator (7), partly evaporated to form the gaseous second fluid, said method further comprising in the condenser-evaporator (7), forcing a liquid stream, which comprises at least a part of the oxygen-enriched liquid removed from the high-pressure column (11) and at least a part of the bottom liquid from the mass transfer column (13), through an evaporation space by means of the pressure of said liquid stream and partially evaporating the liquid stream therein to form the gaseous second fluid, removing a liquid fifth fluid with a fifth oxygen content, which is between the third and fourth oxygen contents, from the mass transfer column (13) between a feed point for the first fluid and a feed point for the oxygen-enriched liquid, and at least partially feeding the liquid fifth fluid into the low-pressure column (12) at a point below the point at which the fourth fluid is at least partially fed into the low-pressure column (12), and removing one or more liquid air product streams from the air separation plant (100-900) wherein said one or more liquid air product streams comprise a removed liquid nitrogen product stream and/or a removed liquid oxygen product stream.

2. The method according to claim 1, in which a previously compressed and cooled first quantity of air is cooled further, and at least partly liquefied, in the condenser-evaporator (7), wherein the cooled and at least partly liquefied first quantity of air is then at least partly supplied to the distillation column system (10).

3. The method according to claim 2, in which the compression of the first quantity of air prior to the at least partial liquefaction in the condenser-evaporator (7) is performed to the first pressure level.

4. The method according to claim 2, in which a previously compressed and cooled second quantity of air is expanded to the second pressure level and fed into the low-pressure column (12).

5. The method according to claim 4, in which compression of the second quantity of air, prior to the cooling thereof and expansion thereof to the second pressure level, is carried out to a pressure level above the first pressure level, wherein said removed liquid nitrogen product stream and said removed liquid oxygen product stream are removed from the air separation plant (100-900) to a liquid nitrogen-equivalent quantity which corresponds to up to 3.5 mole percent of the overall nitrogen and oxygen quantity supplied to the distillation column system (10), or is carried out to the first pressure level, wherein said removed liquid nitrogen product stream and said removed liquid oxygen product stream are removed from the air separation plant (100-900) to a liquid nitrogen-equivalent quantity which corresponds to up to 1.7 mole percent of the overall nitrogen and oxygen quantity supplied to the distillation column system (10), or is carried out to a pressure level below the first pressure level, wherein said removed liquid nitrogen product stream and said removed liquid oxygen product stream are removed from the air separation plant (100-900) to a liquid nitrogen-equivalent quantity which corresponds to up to 1.0 mole percent of overall nitrogen and oxygen quantity supplied to the distillation column system (10), wherein the liquid nitrogen-equivalent quantity is in each case determined from 1.08 times the quantity removed liquid oxygen plus the quantity removed liquid nitrogen.

6. The method according to claim 2, in which a previously compressed and cooled second quantity of air is expanded to the first pressure level and fed into the high-pressure column (11), wherein the compression of the second quantity of air prior to the cooling thereof and expansion thereof to the first pressure level is performed to a pressure level which is above the first pressure level, and wherein one or more gaseous, nitrogen-rich pressurized products is or are removed from the air separation plant (100-900) to a total quantity which corresponds to up to 30 mole percent of nitrogen supplied overall to the distillation column system (10).

7. The method according to claim 1, in which a fraction of the liquid stream which comprises at least a part of the oxygen-enriched liquid removed from the high-pressure column (11) and at least a part of the bottom liquid from the mass transfer column (13), which fraction did not evaporate during the partial evaporation in the condenser-evaporator (7), is prevented from flowing through the evaporation space again.

8. The method according to claim 1, in which the first fluid is formed using bottom fluid from the low-pressure column (12).

9. The method according to claim 1, in which the first fluid is formed using a liquid which is removed from the low-pressure column (12) at a point which is a plurality of theoretical or practical trays above the bottom, wherein further liquid is removed from the bottom of the low-pressure column (12) and removed from the air separation plant (100-900) as said removed liquid nitrogen product stream.

10. The method according to claim 1, in which bottom liquid is removed from the high-pressure column (11) and is fed unchanged in substance composition into the low-pressure column.

11. The method according to claim 1, in which a nitrogen-enriched or nitrogen-rich fluid is removed in gaseous form from the high-pressure column (11) and is then expanded by means of one or more expansion turbines.

12. The method according to claim 2, in which the compression of the first quantity of air prior to the at least partial liquefaction in the condenser-evaporator (7) is performed to a pressure level above the first pressure level.

13. The method according to claim 2, in which the compression of the first quantity of air prior to the at least partial liquefaction in the condenser-evaporator (7) is performed to a pressure level below the first pressure level.

14. The method according to claim 1, in which a previously compressed and cooled first quantity of air is cooled further, and at least partly liquefied, in the condenser-evaporator (7), wherein the cooled and at least partly liquefied first quantity of air is then at least partly supplied to the low-pressure column (12).

15. The method according to claim 1, wherein a liquid nitrogen-enriched stream is removed from an intermediate region of the high-pressure column (11), subcooled, and expanded into the low-pressure column (12).

16. An air separation plant (100-900) comprising:
a distillation column system (10) which has a high-pressure column (11) configured for operation at a first pressure level,
a low-pressure column (12) configured for operation at a second pressure level, below the first pressure level, and
a mass transfer column (13) configured for operation at a third pressure level,
wherein the air separation plant (100-900) is configured to subject, in the mass transfer column (13), a liquid first fluid with a first oxygen content and a gaseous second fluid with a second oxygen content, below the first oxygen content, to mass transfer with one another, to remove a gaseous third fluid with a third oxygen content, reduced in relation to the first oxygen content, from the mass transfer column (13) and to at least partly discharge said third fluid from the air separation plant (100-900), to remove a liquid fourth fluid with a fourth oxygen content, corresponding at least to the second oxygen content, from the further mass transfer column (13) and to at least partly feed said fourth fluid into the low-pressure column (12), to form the first fluid using at least a part of an oxygen-rich liquid removed from the low-pressure column (12), to form the second fluid using an oxygen-enriched liquid removed from the high-pressure column (11), and to mix, and, by means of a condenser-evaporator (7), partly to evaporate, the oxygen-enriched liquid removed from the high-pressure column (11) and bottom liquid of the mass transfer column (13),
wherein the condenser-evaporator (7) is designed, and incorporated in the air separation plant, such that a liquid stream which comprises at least a part of the oxygen-enriched liquid removed from the high-pressure column (11) and at least a part of the bottom liquid from the mass transfer column (13) is forced through an evaporation space by means of its own pressure and partly evaporated therein,
further comprising means for removing a liquid fifth fluid with a fifth oxygen content, between the third and fourth oxygen contents, from the mass transfer column (13) between a feed point for the first fluid and a feed point for the oxygen-enriched liquid, and to at least partly feed said fifth fluid into the low-pressure column (12), and
means for feeding the fifth fluid or a fraction thereof fed into the low-pressure column (12) into the low-pressure column (12) below the fourth fluid or a fraction thereof fed into the low-pressure column (12).

17. The air separation plant (100-900) according to claim 16, in which the high-pressure column (11) and the low-pressure column (12) are connected to one another in a heat-exchanging manner by means of a multi-level cascade evaporator or by means of a falling film evaporator (14).

* * * * *